US007094717B2

(12) United States Patent
Yeckley

(10) Patent No.: US 7,094,717 B2
(45) Date of Patent: *Aug. 22, 2006

(54) SIALON CONTAINING YTTERBIUM AND METHOD OF MAKING

(75) Inventor: Russell L. Yeckley, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 59 days.

This patent is subject to a terminal disclaimer.

(21) Appl. No.: 11/108,225

(22) Filed: Apr. 18, 2005

(65) Prior Publication Data

US 2005/0189683 A1    Sep. 1, 2005

Related U.S. Application Data

(60) Division of application No. 10/455,580, filed on Jun. 5, 2003, which is a continuation-in-part of application No. 09/724,188, filed on Nov. 28, 2000, now Pat. No. 6,693,054.

(51) Int. Cl.
*C04B 35/599* (2006.01)

(52) U.S. Cl. .................. 501/98.2; 501/98.3; 264/659; 264/683

(58) Field of Classification Search ............. 501/98.2, 501/98.3; 264/659, 683
See application file for complete search history.

(56) References Cited

U.S. PATENT DOCUMENTS

| 4,127,416 A | 11/1978 | Lumby et al. |
| 4,547,470 A | 10/1985 | Tanase et al. |
| 4,563,433 A | 1/1986 | Yeckley et al. |
| 4,711,644 A | 12/1987 | Yeckley et al. |
| 4,826,791 A | 5/1989 | Mehrotra et al. |
| 4,880,755 A | 11/1989 | Mehrotra et al. |
| 5,032,553 A | 7/1991 | Tarry |
| 5,200,374 A | 4/1993 | Yamada et al. |

(Continued)

FOREIGN PATENT DOCUMENTS

JP    4-46062    2/1992

(Continued)

OTHER PUBLICATIONS

Mandal, "SiAlON Ceramics Sintered with Additions of $Yb_2O_3$, $Dy_2O_3$, and $Sm_2O_3$ or as Mixtures with $Y_2O_3$," 8th Int'l Met. & Mat'ls Congress II, Istanbul, Turkey, pp. 845-850 (1995).

(Continued)

*Primary Examiner*—Karl Group
(74) *Attorney, Agent, or Firm*—John J. Prizzi

(57) ABSTRACT

A method for making a crystallized ceramic body containing a two phase composite comprising an alpha prime SiAlON phase that contains ytterbium and a beta prime SiAlON phase, the process includes the steps of: blending together a starting powder mixture that upon densification forms the SiAlON ceramic, the starting powder includes at least about 70 weight percent silicon nitride powder wherein the silicon nitride powder contains beta silicon nitride in an amount less than or equal to about 1.6 weight percent of the silicon nitride powder, and the starting powder further including one or more powders that contribute aluminum, oxygen, and nitrogen to the beta prime SiAlON phase and aluminum, oxygen, nitrogen and ytterbium to the alpha prime SiAlON phase; and densifying the starting powder mixture to form a densified SiAlON ceramic; and heat treating the densified ceramic body so as to form the crystallized ceramic body wherein the alpha prime SiAlON phase comprises at least about 20 weight percent of the two phase composite.

5 Claims, 3 Drawing Sheets

U.S. PATENT DOCUMENTS

| | | | |
|---|---|---|---|
| 5,369,065 | A | 11/1994 | Yoshimura et al. |
| 5,370,716 | A | 12/1994 | Mehrotra et al. |
| 5,413,972 | A | 5/1995 | Hwang et al. |
| 5,468,696 | A | 11/1995 | Ishizawa et al. |
| 5,618,768 | A | 4/1997 | Higuchi et al. |
| 5,648,042 | A | 7/1997 | Miller, Jr. |
| 5,908,798 | A | 6/1999 | Chen et al. |
| 6,064,122 | A | 5/2000 | McConnell |
| 6,066,898 | A | 5/2000 | Jensen |
| 6,124,225 | A | 9/2000 | Tien et al. |
| 6,139,791 | A | 10/2000 | Chen et al. |
| 6,471,734 | B1 | 10/2002 | Yeckley |
| 6,693,054 | B1 * | 2/2004 | Yeckley ............ 501/98.2 |
| 6,964,933 | B1 * | 11/2005 | Yeckley ............ 501/98.1 |
| 2004/0102305 | A1 * | 5/2004 | Yeckley ............ 501/98.2 |
| 2005/0189683 | A1 * | 9/2005 | Yeckley ............ 264/659 |

FOREIGN PATENT DOCUMENTS

| | | |
|---|---|---|
| JP | 4046062 | 2/1992 |
| JP | 5-43333 | 2/1993 |
| JP | 5208870 | 8/1993 |
| JP | 5-330919 | 12/1993 |
| JP | 6-32658 | 2/1994 |
| JP | 2966644 | 10/1999 |
| JP | 2988966 | 12/1999 |
| WO | 0002829 | 1/2000 |

OTHER PUBLICATIONS

Wang et al., "Preparation of R-α'-β'-SiAlONs (R=sm,Gd,Dy,Y and Yb) by Pressureless Sintering," Journal of the European Ceramic Society, 13 (1994), pp. 461-465.

Shen et al., "Ytterbium-stabilized α-sialon Ceramics," J. Phys. D. Appl Phys. 29 (1996) pp. 893-904.

Shue, "Microstructure and Mechanical Properties of the In Situ β-$Si_3N_4$/α'-SiAlON Composite," J. Am. Ceramic Society 77 (1994) pp. 2345-2353.

Wittmer et al., "Economic Comparison of Continuous and Batch Sintering of Silicon Nitride," American Ceramic Society Bulletin, vol. 72, No. 6 (Jun. 1993) pp. 129-137.

Wittmer et al., "Economic Comparison of Continuous and Batch Sintering of $Si_3N_4$," American Ceramic Society Bulletin, vol. 70, No. 9 (1991) pp. 1519-1527.

Wittmer et al., "Continuous Sintering of $Si_3N_4$ in a Controlled Atmosphere Belt Furnace," pp. 546-562.

English Abstract of UP-4046062A, SiAlON sintered Body and Production Thereof and Gas Turbine-Blade using the Same, Jun. 1990.

English Abstract of JP-3290373A, SiAlON-based Sintered Material and Production Thereof, Apr. 1990.

English Abstract of JP-4042864A, Highly Strong SiAlON Sintered Product, Jun. 1990.

English Abstract of JP-4002664A, High-Strength SiAlON Based Sintered Compact, Apr. 1990.

Puddephatt et al., "The Periodic Table of the Elements," Clarendon Press (1986) pp. 90-95.

Izhevskiy et al., Progress in SiAlON Ceramics, Journal of the European Ceramic Society, 20 (2000) pp. 2275-2295.

CRC Handbook of Chemistry and Physics, CRC Press (1998) pp. 4-121.

Notification of Transmittal of the International Preliminary Examination Report in PCT Patent Application PCT/US01/47094 (10 pages) mailed Jan. 1, 2003.

International Preliminary Examination Report in PCT Patent Application PCT/US01/47094 (10 pages) mailed Feb. 2, 2003.

Shen et al., "Reactions Occuring in Post Heat Treated α/β2 Sialons; On the Thermal Stability of α-Sialon," Journal of European Ceramic Society 16 (1996) pp. 873-883.

Nordberg et al., Stability and Oxidation Properties of RE- α Sialon Ceramics (RE-Y, Sm, Yb), J. Am. Ceramic Society 81 (6) pp. 1461-1470 (1998).

Watari et al., Reaction Process and Densification Process of Mixed α'/β' Sialon Ceramics, Journal of the European Ceramic Society 15 (1995) pp. 173-184.

Menik, et al., Quantitative Phase Analysis of Synthetic Silicon Nitride by Z-Ray Diffraction, Advances in X-Ray Analysis, vol. 23, 1979, pp. 375-379.

Wang et al., "Formation and Densification of R-α'-SiAlONs (R=Nd, Sm, Gd, Dy, Er and Yb)," Mal. Res. Soc. Symp. Proc. vol. 287 (1993), Materials Research Soc.

* cited by examiner

US 7,094,717 B2

SIALON CONTAINING YTTERBIUM AND METHOD OF MAKING

RELATED APPLICATION

This application is a division of application Ser. No. 10/455,580, filed Jun. 5, 2003, which was a continuation-in-part of application Ser. No. 09/724,188, filed Nov. 28, 2000, and issued Feb. 17, 2004, as U.S. Pat. No. 6,693,054.

FIELD OF THE INVENTION

The invention pertains to a ceramic material, as well as a method of making the same, that contains silicon aluminum oxynitride (SiAlON) and ytterbium.

BACKGROUND OF THE INVENTION

SiAlON materials have a number of uses such as, for example, cutting inserts for various metal cutting application and wear parts for various wear applications (e.g., plunger rods for pumps, plunger ball blanks, down hole pump check valve blanks, bushings, blast nozzles, and other wear and impact applications).

Ceramic materials have also been used in high temperature wear applications in structures like, for example, microturbines. In the microturbine applications, the ceramic materials may comprise the stator (i.e., the stationary blades), the rotor (including the rotor blades), the fuel injector nozzle, and the shroud. These components of the microturbine require adequate high temperature creep resistance and adequate high temperature deformation resistance.

Exemplary patents that disclose SiAlON materials are U.S. Pat. No. 4,563,433 and U.S. Pat. No. 4,711,644. One article that discusses SiAlON materials is Izhevskiy et al., "Progress in SiAlON ceramics, Journal of the European Ceramic Society 20 (2000) pages 2275–2295.

SiAlON materials may contain an alpha prime (or alpha') phase and a beta prime (or beta') phase and one or more other phases such as, for example, a glassy phase and/or a crystalline phase. The alpha prime SiAlON phase may be of the formula $M_xSi_{12-(m+n)}Al_{m+n}O_nN_{16-n}$ where M is Li, Ca, Y or other lanthanides and where the theoretical maximum of x is 2, the value of n ranges between greater than 0 and less than or equal to 2.0, and the value of m ranges between greater than or equal to 0.9 and less than or equal to 3.5. The beta prime SiAlON phase may be of the formula $Si_{6-z}Al_zO_zN_{8-z}$ where $0<z\leq 4.2$. In the case where M is yttrium, the crystalline phases may include YAG (yttrium aluminum garnet) which is a cubic phase of the formula $Y_3Al_5O_{12}$; YAM which is a monoclinic phase of the formula $Y_4Al_2O_9$; N—YAM which is a monoclinic phase of the formula $Y_4Si_2O_7N_2$; and Y—N-α-Wollastonite which is a monoclinic phase of the formula $YSiO_2N$.

SiAlON materials may comprise an alpha prime SiAlON phase and a beta prime SiAlON phase, as well as further contain silicon carbide particles dispersed throughout the SiAlON matrix. Such a SiAlON material is disclosed in U.S. Pat. No. 4,826,791 to Mehrotra et al.

Other ceramic materials include an alpha prime SiAlON phase, a beta SiAlON phase and an intergranular phase wherein the ceramic optionally contains refractory phases. The ceramic material has an alloyed surface with a higher oxygen and aluminum content. U.S. Pat. No. 4,880,755 to Mehrotra et al. discloses such a ceramic material.

U.S. Pat. No. 5,370,716 to Mehrotra et al. discloses a high Z-SiAlON material comprising beta prime SiAlON phase. The beta prime SiAlON phase has a formula $Si_{6-z}Al_zO_zN_{8-z}$ where $1<z<3$.

U.S. Pat. No. 5,908,798 to Chen et al. discloses a SiAlON material wherein the focus is on the reinforcement of alpha prime SiAlON with elongated grains of alpha prime SiAlON. The examples that include ytterbium produce a material with only alpha prime SiAlON phase that does not contain any beta prime SiAlON phase.

U.S. Pat. No. 6,124,225 to Tien et al. focuses upon the use of gadolinium (Gd) in a SiAlON material to produce an alpha prime SiAlON material that is reinforced by elongated grains of alpha prime SiAlON.

Although current SiAlON cutting inserts exhibit acceptable properties (e.g., hardness, toughness, thermal shock resistance) it would be desirable to provide for an improved SiAlON material that has application as a cutting insert that exhibits improved metal cutting performance properties including hardness, Young's modulus, toughness, thermal conductivity, and thermal shock resistance. The same is true for SiAlON wear parts in that although current SiAlON wear parts have acceptable properties (e.g., hardness, Young's modulus, toughness, thermal conductivity, and thermal shock resistance), it would be desirable to provide an improved SiAlON material that has application as a wear part that exhibits improved properties.

SUMMARY OF THE INVENTION

In one form thereof, the invention is a ceramic body made from a starting powder mixture that includes silicon nitride powder, and one or more powders that contribute aluminum, oxygen and nitrogen to a beta prime SiAlON phase and aluminum, oxygen, nitrogen and ytterbium to an alpha prime SiAlON phase. The ceramic body comprises a two phase composite that comprises the alpha prime SiAlON phase and the beta prime SiAlON phase wherein the alpha prime SiAlON phase contains ytterbium therein. The starting silicon nitride powder comprises less than or equal to about 1.6 weight percent beta-silicon nitride. The alpha prime SiAlON phase is present in an amount greater than or equal to about 20 weight percent of the two phase composite. An intergranular phase is present that includes an intergranular crystalline phase comprising at least one of YbAG and J-phase. The overall composition of the ceramic body is: $Yb_aSi_bAl_cO_dN_e$, wherein when a is less than 0.05, the relative intensity of the peak associated with either one or both intergranular crystalline phases of YbAG and J-phase is greater than about 2.5 of the major peak of the two-phase composite.

In yet another form thereof, the invention is a SiAlON ceramic body made from a starting powder mixture that includes silicon nitride powder and one or more powders that provide aluminum, oxygen, nitrogen and ytterbium to the SiAlON ceramic body. The SiAlON ceramic body comprises a two phase composite that contains alpha prime SiAlON phase and beta prime SiAlON phase wherein the alpha prime SiAlON phase containing ytterbium therein. The starting silicon nitride powder comprises less than or equal to about 1.6 weight percent beta-silicon nitride. The alpha prime SiAlON phase is present in an amount greater than or equal to about 20 weight percent of the two phase composite. There is also present an intergranular phase that includes an intergranular crystalline phase comprising at least one of YbAG and J-phase. The overall composition of the ceramic body is $Yb_aSi_bAl_cO_dN_e$, and wherein when a is less than 0.05, the relative intensity of the peak associated with either one or both intergranular crystalline phases of YbAG and J-phase is greater than about 2.5 of the major peak of the two-phase composite. The intergranular phase includes a YbAG crystalline phase present in an amount wherein the relative intensity of the major peak associated with the YbAG phase is between about 2 and about 25 of the major peak of the two-phase composite.

In another form thereof, the invention is a SiAlON ceramic body made from a starting powder mixture that includes silicon nitride powder and one or more powders that provide aluminum, oxygen, nitrogen and ytterbium to the SiAlON ceramic body. The SiAlON ceramic body comprises a two phase composite that comprises alpha prime SiAlON phase and beta prime SiAlON phase wherein the alpha prime SiAlON phase contains ytterbium therein. The starting silicon nitride powder comprises less than or equal to about 1.6 weight percent beta-silicon nitride. The alpha prime SiAlON phase is present in an amount greater than or equal to about 20 weight percent of the two phase composite. An intergranular phase includes an intergranular crystalline phase comprising at least one of YbAG and J-phase. The overall composition of the ceramic body is: $Yb_aSi_bAl_cO_dN_e$, and wherein when a is less than 0.05, the relative intensity of the peak associated with either one or both intergranular crystalline phases of YbAG and J-phase is greater than about 2.5 of the major peak of the two-phase composite. The intergranular phase includes a J-phase crystalline phase present in an amount wherein the relative intensity of the major peak associated with the J-phase is between about 1 and about 31 of the major peak of the two-phase composite.

In still another form thereof, the invention is a ceramic component for a microturbine wherein the component is subjected to temperatures of between about 1100 degrees Centigrade to about 1350 degrees Centigrade for a duration up to about 10,000. The ceramic component comprises a ceramic body made from a starting powder mixture that includes silicon nitride powder and one or more powders that provide aluminum, oxygen, nitrogen and ytterbium to the SiAlON ceramic body, and wherein the starting silicon nitride powder comprising less than or equal to about 1.6 weight percent beta-silicon nitride. The ceramic body comprises a two phase composite that comprises alpha prime SiAlON phase and beta prime SiAlON phase wherein the alpha prime SiAlON phase contains ytterbium therein. The alpha prime SiAlON phase is present in an amount greater than or equal to about 20 weight percent of the two phase composite. An intergranular phase includes an intergranular crystalline phase comprising at least one of YbAG and J-phase. The overall composition of the ceramic body is: $Yb_aSi_bAl_cO_dN_e$, and wherein when a is less than 0.05, the relative intensity of the peak associated with either one or both intergranular crystalline phases of YbAG and J-phase is greater than about 2.5 of the major peak of the two-phase composite.

In yet another form thereof, the invention is a process for making a crystallized ceramic body containing a two phase composite comprising an alpha prime SiAlON phase that contains ytterbium and a beta prime SiAlON phase, the process comprising the steps of: blending together a starting powder mixture that upon densification forms the SiAlON ceramic, the starting powder includes at least about 70 weight percent silicon nitride powder wherein the silicon nitride powder contains beta silicon nitride in an amount less than or equal to about 1.6 weight percent of the silicon nitride powder, and the starting powder further including one or more powders that contribute aluminum, oxygen, and nitrogen to the beta prime SiAlON phase and aluminum, oxygen, nitrogen and ytterbium to the alpha prime SiAlON phase; and densifying the starting powder mixture to form a densified SiAlON ceramic; and heat treating the densified ceramic body so as to form the crystallized ceramic body wherein the alpha prime SiAlON phase comprises at least about 20 weight percent of the two phase composite.

BRIEF DESCRIPTION OF THE DRAWINGS

The following is a brief description of the drawings that accompany and form a part of this patent application.

DETAILED DESCRIPTION OF THE INVENTION

Figure 1:
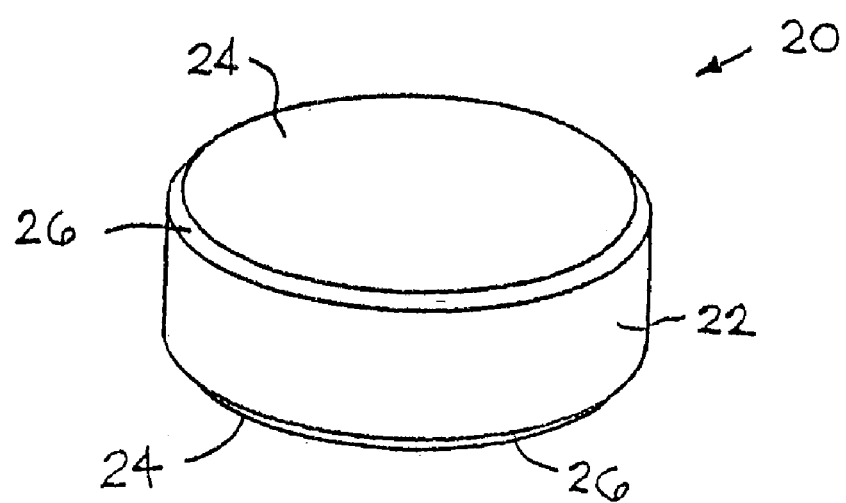
FIG. 1 is an isometric view of a first specific embodiment of a cutting insert that does not have a coating.

The invention pertains to a ceramic material, and more specifically, to a silicon aluminum oxynitride (SiAlON) material that contains ytterbium. Applicant contemplates that the SiAlON material may include one or more of erbium, thulium, scandium and/or lutetium either with or without ytterbium.

SiAlON materials have been used as cutting inserts in a variety of metal cutting applications. SiAlON materials have also been used as wear parts for various wear applications and impact parts for various impact applications. The SiAlON material of the present invention has application as a cutting insert, a wear part, an impact part, and any other article wherein the properties of a hard dense ceramic material are desirable.

In the present invention, the SiAlON material contains an alpha prime phase of the formula $Yb_xSi_{12-(m+n)}Al_{m+n}O_nN_{16-n}$. In some instances, applicant has not determined the values of x, m, and n for the material of the present invention. However, applicant would expect the value of x to have a theoretical maximum of 2. Applicant also would expect the value of n to range between greater than 0 and less than or equal to 2.0, and the value of m to range between greater or equal to 0.9 and less than or equal to 3.5.

The alpha prime SiAlON phase comprises generally equi-axed grains. The SiAlON material also contains a beta prime phase of the formula $Si_{6-z}Al_zO_zN_{8-z}$. The preferred values for z range between greater than 0.3 and less than 1.5 wherein different applications have different preferred ranges of the "z" value. For example, the preferred value for z ranges between greater than 0.3 and less than 0.6 for applications in which the invention is used as a cutting tool to machine cast iron. As another example, the preferred value for z ranges between greater than 0.7 and less than 1.5 for applications in which the invention is used as a cutting tool to machine a high temperature alloy (e.g., Inconel 718). The beta prime SiAlON phase comprises generally elongated grains.

In one range for the alpha prime SiAlON phase content, especially when the ceramic is made from a starting powder mixture that includes silicon nitride powder wherein less than or equal to about 1.6 weight percent of the starting silicon nitride powder comprises beta-silicon nitride and greater than or equal to about 98.4 weight percent of the starting silicon nitride powder comprises alpha-silicon nitride, the alpha prime phase is present in an amount between about 25 weight percent and about 85 weight percent of the total of the alpha prime SiAlON phase and beta prime SiAlON phase content of the SiAlON material. In another range, the alpha prime SiAlON phase is present in an amount between about 45 weight percent and about 85 weight percent of the total of the alpha prime SiAlON phase and beta prime phase content of the SiAlON material. In still another range, the alpha prime SiAlON phase is present in an amount between about 60 weight percent and about 80 weight percent of the total of the alpha prime SiAlON phase and beta prime SiAlON phase content of the SiAlON material. The content of the alpha prime SiAlON phase is typically measured by X-ray diffraction techniques.

In one range, especially when the ceramic is made from a starting powder mixture that includes silicon nitride powder wherein less than or equal to about 1.6 weight percent of the starting silicon nitride powder comprises beta-silicon nitride and greater than or equal to about 98.4 weight percent of the starting silicon nitride powder comprises alpha-silicon nitride, the beta prime SiAlON phase is present in an amount between about 15 and about 75 weight percent of the total of the alpha prime SiAlON phase and beta prime SiAlON phase content of the SiAlON material. In another range, the beta prime SiAlON phase is present between about 15 weight percent and about 55 weight percent of the total of the alpha prime SiAlON phase and beta prime SiAlON phase content of the SiAlON material. In still another range, the beta prime SiAlON phase is present between about 20 weight percent and about 40 weight percent of the total of the alpha prime SiAlON phase and beta prime SiAlON phase content of the SiAlON material. The content of the beta prime SiAlON phase is typically measured by X-ray diffraction techniques.

The SiAlON material also contains one or more additional phases including an intergranular phase. The intergranular phase may comprise a glassy phase and an intergranular crystalline phase may sometimes also be present. At the present time, applicant is not certain of the specific amount of additional phases typically present in the SiAlON material. However, applicant estimates that the intergranular phase, which typically includes a glassy phase and possibly an intergranular crystalline phase, is present. The glassy phase is typically an amorphous phase.

The intergranular crystalline phases that may be present are: YbAG (ytterbium aluminum garnet) which is a cubic phase of the formula $Yb_3Al_5O_{12}$), and J-phase which has the formula $Yb_4Si_{2-x}Al_xO_{7+x}N_{2-x}$ wherein x ranges from 0 to 2.

Referring to the drawings, FIG. 1 illustrates a RNG-T style of a cutting insert generally designated as 20. The cutting insert 20 has a flank surface 22 that is generally cylindrical in shape and a pair of opposite rake surfaces 24 that are each generally circular in shape. The flank surface 22 intersects with the rake surfaces 24 to define circular cutting edges 26. The cutting edge 26 has a bevel. Cutting insert 20 comprises the SiAlON material of the present invention.

Figure 2:
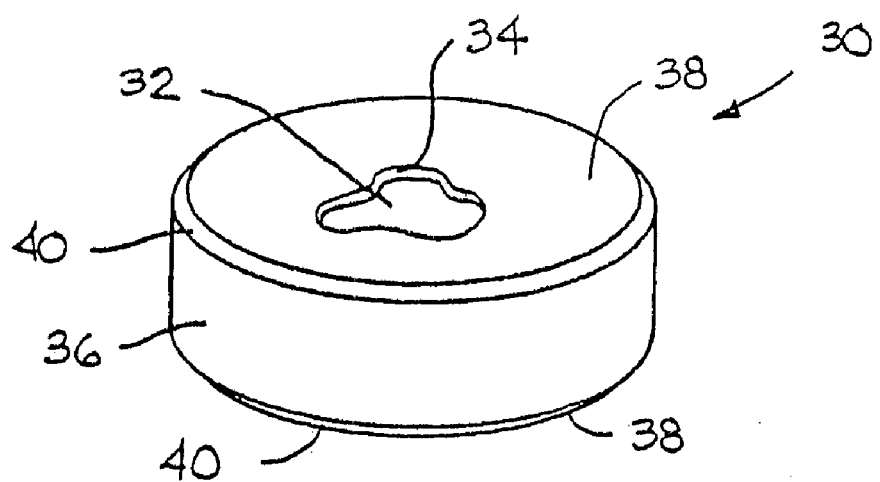
FIG. 2 is an isometric view of a second specific embodiment of a cutting insert wherein the cutting insert has a coating and a part of the coating has been removed to expose the substrate.

FIG. 2 illustrates a second specific embodiment of a cutting insert generally designated as 30. Cutting insert 30 has a substrate 32 and a coating 34. Cutting insert 30 has a generally cylindrical flank surface 36 and a pair of opposite generally circular rake surfaces 38. The flank surface 36 intersects the rake surfaces 38 to form circular cutting edges 40. Each cutting edge 40 has a bevel. The substrate 32 comprises the SiAlON material of the present invention. The coating may include a coating scheme of one or more layers applied by known techniques including chemical vapor deposition (CVD) and physical vapor deposition (PVD). The coating materials may include CVD-applied alumina applied to a depth of between 1 to 10 micrometers or to a more preferred depth of 3 to 5 micrometers. The coating materials may also include PVD-applied titanium aluminum nitride. The coating materials may further include multi-layer coating schemes wherein it is preferable that the layer adjacent to the substrate comprise alumina.

In the following examples, the physical properties of a yttrium-containing SiAlON material were compared to the physical properties of a ytterbium-containing SiAlON material. Table 1 sets forth starting powder compositions (in weight percent) of Batch Nos. 982 and 1030 which are ytterbium-containing materials and Batch No. 941A which is a yttrium-containing material. These compositions (i.e., Batch Nos. 982, 1030 and 941A) were made such that the molar content of the ytterbia in Batch Nos. 982 and 1030 was the same as the molar content for the yttria in Batch No. 941A. The starting powder mixture for each one of Batch Nos. 982, 1030 and 941A contained silicon nitride powder wherein about 1.6 weight percent of the starting silicon nitride powder comprised beta-silicon nitride powder and about 98.4 weight percent of the starting silicon nitride powder comprised alpha-silicon nitride.

TABLE 1

Starting Powder Compositions
for Batch Nos. 982, 1030 and 941A
[in weight percent]

| Batch No. | Silicon Nitride [Starck M11] | Silicon Nitride [Ube SNE-03] | Aluminum Nitride [Starck Grade A] | Aluminum Oxide [Ceralox HPA-0.5] | Ytterbia [Molycorp] | Yttria |
|---|---|---|---|---|---|---|
| 982 | 20.57 | 61.70 | 5.97 | 3.56 | 8.20 | — |
| 1030 | 21.07 | 63.22 | 6.00 | 1.50 | 8.20 | — |
| 941A | 21.35 | 64.05 | 6.20 | 3.70 | — | 4.70 |

The starting powders are briefly described as follows. One of the silicon nitride powders was from Herman C. Starck of New York. N.Y. (USA) under the designation M11. Another of the silicon nitride powders was from Ube Industries, Ltd. Of Tokyo, Japan. under the designation SNE-03. The aluminum nitride was from Herman C. Starck under the designation Grade A. The aluminum oxide was from Ceralox Corporation of Tucson, Ariz. (USA) under the designation HPA-0.5 (which contains a deliberate addition of 0.5 weight percent magnesia). The ytterbia was from Molycorp. The yttria was a fine grade yttria available from Herman C. Starck.

Each one of the above Batch Nos. set out in Table 1, the starting composition was milled for a time of between about 8 hours and about 16 hours with isopropanol and using an alpha' SiAlON-beta' SiAlON media to form a slurry. After completion of the milling, the slurry was discharged through a 400 mesh screen and then vacuum dried to form a dry powder. The dry powder was then fitzmilled and pellitized using a fluid bed process. Rosin and Carbowax 400 were added as binders during the fluidization process. The pellitized material (dry powder and the binder material) was then dry pressed into green compacts with a density of between about 2 to about 2.15 grams per cubic centimeter. The binder was then removed by an air burnout cycle that had a maximum temperature of about 875 degrees Fahrenheit.

These compacts were then loaded into BN (boron nitride) saggers that had dimensions of 4 inches×8 inches×1.25 inches. There were three layers of compacts per box with 55 compacts per layer for the RNG43 and CNGA433 style cutting inserts. The BN saggers were stacked two high and placed on the belt of a continuous sinter furnace. The furnace had four independently controlled heating zones wherein each heating zone was 12 inches long. The ramp rate for the heat up was about 150 degrees Centigrade per minute. The furnace is along the lines of the furnace described in U.S. Pat. No. 5,648,042 to Miller, Jr. entitled HIGH TEMPERATURE BELT FURNACE APPARATUS AND METHOD OF USING THE SAME, except that the furnace used in these examples had four heating zones.

The use of a belt furnace to sinter a compact is disclosed in Wittmer et al., "Economic Comparison of Continuous and Batch Sintering of Silicon Nitride", *American Ceramic Society Bulletin*, Vol. 72, No. 6 (1993), pp. 129–137; Wittmer et al., Comparison of Continuous Sintering to Batch Sintering of $Si_3N_4$", *Ceramic Bulletin*, Vol. 70, No. 9 (1991) pp. 1519–1527; and Wittmer et al., "Continuous Sintering of $Si_3N_4$ in a Controlled Atmosphere Belt Furnace". Published PCT Patent Application No. PCT/US99/14231 with an International Filing Date of Jun. 23, 1999 for a CERAMIC AND PROCESS FOR THE CONTINUOUS SINTERING THEREOF discloses the continuous sintering in a belt furnace of a ceramic wherein the sintered product includes an alpha'-SiAlON phase and a beta'-SiAlON phase.

As shown in Table 2, each one of the Batch Nos. 982, 1030 and 941A was continuously sintered in two different ways. In this regard, Table 2 below sets forth the sintering parameters for Examples 1 through 4 (that contain ytterbium) and Examples A and B (that do not contain ytterbium). For each heating zone, Table 2 sets forth the temperature (degrees Centigrade) to which the compacts are exposed during the continuous sintering treatment. The compacts spent about 30 minutes in each one of the heating zones.

TABLE 2

Sintering Parameters for Examples 1–4 and A and B

| Example/Batch No. | Heating Zone 1 | Heating Zone 2 | Heating Zone 3 | Heating Zone 4 |
|---|---|---|---|---|
| 1/982 [Invention] | 1770 | 1770 | 1770 | 1770 |
| 2/1030 [Invention] | 1765 | 1765 | 1765 | 1765 |
| 3/1030 [Invention] | 1550 | 1700 | 1765 | 1765 |
| 4/982 [Invention] | 1550 | 1700 | 1765 | 1765 |
| A/941A [Comparative] | 1770 | 1770 | 1770 | 1770 |
| B/941A [Comparative] | 1550 | 1700 | 1765 | 1765 |

Table 3 below sets forth the phases present and the physical properties for each of the examples. The Vickers hardness (Hvn) was measured using a 18.5 kilogram load and is set forth in gigapacals. The fracture toughness ($K_{IC}$) was measured on a polished surface employing a Palmqvist indentation technique using a 18.5 kg load on a Vickers indentor per the article by Evans and Charles, "Fracture Toughness Determination by Indentation", J. American Ceramic Society, Vol. 59, Nos. 7–8, pages 371–372. As set forth in Table 3, the weight percent of the alpha prime SiAlON phase and the beta prime SiAlON phase is of the total of the alpha prime SiAlON phase and the beta prime SiAlON phase.

TABLE 3

Phases Present and Physical Properties of Examples 1–4, A and B

| Example | α'-SiAlON [Weight Percent] | β'-SiAlON [Weight Percent] | Glassy Phase | Crystalline Phase [B-phase] Present [Relative Intensity] | Hvn (Gpa) | $K_{IC}$ (MPa m ½) |
|---|---|---|---|---|---|---|
| 1 | 47.0 | 53 | | | 18.80 | 7.14 |
| 2 | 54.2 | 45.8 | | | 19.78 | 7.23 |
| 3 | 57.2 | 42.8 | | | 19.99 | 7.03 |
| 4 | 49.7 | 50.3 | | | 19.24 | 6.72 |
| A | 42.3 | 57.7 | | 6.3 | 18.88 | 5.23 |
| B | 45.0 | 55 | | 1.9 | 18.15 | 6.06 |

The data set forth in Table 3 above shows that ytterbium-containing SiAlON materials (Examples 1–4) exhibited a higher hardness and increased toughness than did the yttria-containing SiAlON materials (Examples A and B). The absence of any B-phase or any Wollastonite crystalline phase in the ytterbium-containing SiAlON materials most likely made a contribution to the higher toughness. It would also seem like the smaller ionic radius of ytterbia as compared to yttria may lead to an improvement in the resistance to the formation of B-phase and/or Wollastonite during sintering. The yttria-containing examples (Examples A and B) each contained B-phase ($Yb_2SiAlO_5N$) as shown in Table 3.

Figure 3:
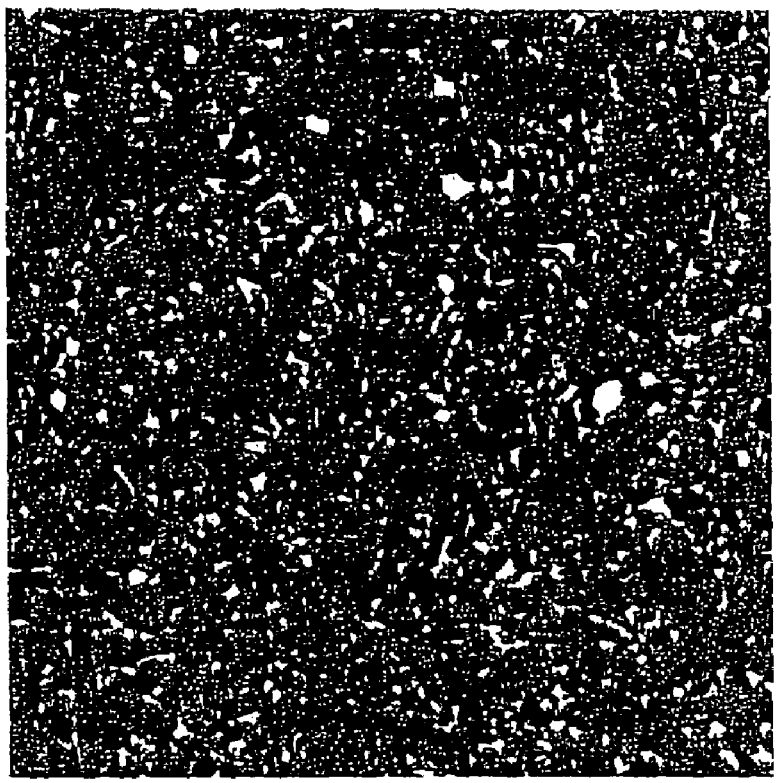
FIG. 3 is a photomicrograph showing the microstructure of a yttrium-containing SiAlON material (Example C as described hereinafter) wherein the scale of the photomicrograph is such that it represents a 35 micron square.
Figure 4:
FIG. 4 is a photomicrograph showing the microstructure of a ytterbium-containing SiAlON material (Example 2 as described hereinafter) that contains alpha prime SiAlON grains that are equi-axed in shape and beta prime SiAlON grains that are elongate in shape, and wherein the scale of the photomicrograph is such that it represents a 35 micron square.

FIG. 3 is a photomicrograph of the microstructure of Example 2 [Batch No. 982 continuously sintered at 1765 degrees Centigrade for 120 minutes] and FIG. 4 is a photomicrograph of the microstructure of Example C [Batch No. 941A continuously sintered at 1765 degrees Centigrade for 120 minutes]. In FIG. 4 the dark prismatic grains are beta prime SiAlON phase while the lighter gray grains are the alpha prime SiAlON phase. The brightest areas are a ytterbia-alumina-silica glassy phase.

As shown by Examples 1–4, applicant has found that the present invention produces a ceramic that has an alpha prime SiAlON and a beta prime SiAlON phase wherein the ceramic has a high fracture toughness (e.g., a $K_{IC}$ of greater than or equal to 6.0 MPam$^{1/2}$, and more preferably, a $K_{IC}$ of greater than or equal to 6.5 MPam$^{1/2}$) together with an alpha prime SiAlON phase content of greater than or equal to about 45 weight percent of the sum of the alpha prime SiAlON phase and the beta prime SiAlON phase.

Applicant has also found that the amount of the beta silicon nitride in the starting silicon nitride powder has an impact upon the amount of the alpha prime SiAlON phase present in the as-sintered microstructure. More specifically, as the amount of beta silicon nitride in the starting silicon nitride powder increases, the amount of alpha SiAlON in the as-sintered microstructure decreases. Applicant further believes that the higher toughness is obtained when the beta silicon nitride content in the starting silicon nitride powder is less than or equal to about 1.6 weight percent of the starting silicon nitride powder. In regard to each one of Examples 1–4, the content of the beta-silicon nitride in the starting silicon nitride powder mixture was about 1.6 weight percent and the content of the alpha-silicon nitride in the starting silicon nitride powder was about 98.4 weight percent.

The amount of beta silicon nitride in the starting powder mixture may be controlled in one of two ways. One way is to blend predetermined amounts of two or more silicon nitride powders wherein the alpha and beta contents of each powder is known so as to achieve a silicon nitride powder of a known beta content. The other way is to take 100 percent alpha silicon nitride powder and add a selected amount of 100 percent beta silicon nitride powder to it to achieve a silicon nitride powder of a known beta content. This latter way facilitates control of the particle size of the beta silicon nitride component.

While applicant does not intend to be restricted by any particular theory, applicant believes that the beta silicon nitride particles are seeds for the nucleation and growth of the beta prime SiAlON grains. As the number of the beta silicon nitride particles increase the beta prime SiAlON grains impinge each other sooner so as to limit the formation of high aspect ratio beta prime SiAlON grains. In addition, as the number of the beta silicon nitride particles increases the content of the alpha prime SiAlON grains decreases. The use of fewer beta silicon nitride particles in the starting powder mixture results in a limited number of nucleation sites for the beta prime SiAlON grains to grow into the alpha prime SiAlON matrix during sintering. This results in beta prime SiAlON grains with a higher aspect ratio which causes a toughening of the alpha prima SiAlON phase matrix.

Examples 5 through 13 were produced to show the influence of the beta silicon nitride content in the starting powder on the properties of the SiAlON material. Table 4 below presents the composition of the starting powder mixtures in weight percent.

TABLE 4

Starting Powder Composition for Examples 5 through 13

| Example/ Batch No. | Silicon Nitride (wt %) | *beta-Silicon Nitride (wt %) | Aluminum nitride (wt %) | Alumina (wt %) | Ytterbia (wt %) |
| --- | --- | --- | --- | --- | --- |
| 5/1166D | 84.3 | 0 | 6.00 | 1.50 | 8.20 |
| 6/1030 | 84.3 | 1.6 | 6.00 | 1.50 | 8.20 |
| 7/1145C | 84.3 | 8 | 6.00 | 1.50 | 8.20 |
| 8/1374D | 82.27 | 0 | 5.97 | 3.56 | 8.20 |
| 9/982 | 82.27 | 1.6 | 5.97 | 3.56 | 8.20 |
| 10/1145B | 82.27 | 2 | 5.97 | 3.56 | 8.20 |
| 11/1145A | 82.27 | 8 | 5.97 | 3.56 | 8.20 |
| 12/1196B | 84.3 | 1.6 | 6.00 | 1.50 | 8.20 |
| 13/1166C | 84.3 | 0 | 6.00 | 1.50 | 8.20 |

*Weight percent of the starting silicon nitride that comprised beta-silicon nitride and the balance of the silicon nitride powder comprised alpha silicon nitride and impurities.

The above starting powders were processed in a fashion like the processing of the starting powders of Batch No. 982. Properties of the milled powder mixture are set forth in Table 5 below.

TABLE 5

Starting Powder Composition for Examples 5 through 13

| Example/ Batch No. | BET [m²/gram] | Oxygen (wt %) | 10% < Particle Size Distribution | 50% < Particle Size Distribution | 90% < Particle Size Distribution |
| --- | --- | --- | --- | --- | --- |
| 5/1166D | 4.92 | 2.76 | 0.32 | 0.75 | 1.48 |
| 6/1030 | 6.67 | 2.93 | 0.3 | 0.76 | 1.58 |
| 7/1145 | 13.4 | 3.25 | 0.21 | 0.52 | 1.31 |
| 8/1374D | 4.71 | 3.87 | 0.38 | 0.91 | 1.69 |
| 9/982 | 6.9 | 3.96 | 0.28 | 0.72 | 1.52 |
| 10/1145B | 11 | 4.07 | 0.23 | 0.58 | 1.51 |
| 11/1145A | 13.4 | 4.26 | 0.23 | 0.55 | 1.28 |
| 12/1196B | 7.16 | 3.1 | 0.3 | 0.77 | 1.67 |
| 13/1166C | 4.92 | 2.76 | 0.32 | 0.75 | 1.48 |

Table 6 below sets forth the temperature for each one of the four heating zones in the furnace in degrees Centigrade. The compacts spent about 30 minutes in each one of the heating zones. Table 6 also sets forth the weight percent of the alpha prime SiAlON phase in the as-sintered material as compared to the sum of the alpha prime SiAlON phase and the beta prime SiAlON phase wherein the beta prime SiAlON phase comprises the remainder of the crystalline phases. The hardness is set forth in Vickers hardness (Hvn) and the fracture toughness ($K_{IC}$) is set forth in MPam½.

TABLE 6

Heat Treating Parameters, Alpha Prime SiAlON Content,
Hardness and Fracture Toughness for Examples 5–13

| Example/Batch No./wt. % beta Silicon Nitride | Zone 1 (° C.) | Zone 2 (° C.) | Zone 3 (° C.) | Zone 4 (° C.) | wt % α'-SiAlON* | Hvn (GPa) | KIC (MPa m$^{1/2}$) |
|---|---|---|---|---|---|---|---|
| 5/1166D/0% | 1550 | 1700 | 1765 | 1765 | 83.9 | 20.31 | 6.40 |
| 6/1030/1.6% | 1550 | 1700 | 1765 | 1765 | 57.2 | 19.08 | 7.28 |
| 7/1145C/8% | 1550 | 1700 | 1765 | 1765 | NA [not analyzed] | 18.25 | 5.54 |
| 8/1374D/0% | 1550 | 1700 | 1765 | 1765 | 65.5 | 18.63 | 6.84 |
| 9/982/1.6% | 1550 | 1700 | 1765 | 1765 | 49.7 | 19.24 | 6.96 |
| 10/1145B/2% | 1550 | 1700 | 1765 | 1765 | 45 | 18.69 | 6.65 |
| 11/1145A/8% | 1550 | 1700 | 1765 | 1765 | 37.7 | 18.11 | 6.00 |
| 12/1196B/1.6% | 1550 | 1700 | 1800 | 1800 | 61.6 | 18.28 | 8.19 |
| 13/1166C/0% | 1550 | 1700 | 1800 | 1800 | 78 | 19.31 | 7.59 |

*The remainder of the crystalline phases comprised beta prime SiAlON phase.

The results in Table 6 show that the fracture toughness ($K_{IC}$) of Examples 5 through 7, 12 and 13 were the highest when the beta-silicon nitride content of the starting silicon nitride powder was 1.6 weight percent. In this regard, Example 6 has a fracture toughness ($K_{IC}$) equal to 7.28 Mpa m½. The same was true for Examples 9 through 11 in that the fracture toughness was the greatest for the example (i.e., Example 9) that had a beta-silicon nitride content in the starting silicon nitride powder equal to 1.6 weight percent.

The results set forth in Tables 4 through 6 show that by controlling the content of the beta-silicon nitride in the starting silicon nitride powder, one can control the content of the alpha prime SiAlON phase in the as-sintered ceramic SiAlON material even though the overall composition of the starting powders (i.e., the content of the silicon nitride [alpha-silicon nitride and beta-silicon nitride], aluminum nitride, alumina and ytterbia) remains the same.

More specifically, the overall composition of the starting powders of Examples 5 and 6 was the same in that it comprised 84.3 weight percent silicon nitride (alpha-silicon nitride and beta-silicon nitride), 6.00 weight percent aluminum nitride, 1.50 weight percent alumina, and 8.20 weight percent ytterbia. Examples 5 and 6 were processed the same.

The difference between Examples 5 and 6 was in the weight percent of the starting silicon nitride powder that comprised beta-silicon nitride. In this regard, Examples 5 and 6 contained 0 weight percent and 1.6 weight percent of beta-silicon nitride, respectively, with the balance of the starting silicon nitride powder comprising alpha-silicon nitride.

Table 6 shows that the crystalline phases of the as-sintered ceramic material of Examples 5 and 6 contained 83.9 weight percent alpha prime SiAlON and 57.2 weight percent alpha prime SiAlON, respectively, with the balance comprising beta prime SiAlON phase. Examples 5 and 6 show that even though the overall compositions and the processing were the same, by controlling the amount of beta-silicon nitride in the silicon nitride starting powder, one can control the content of the alpha prime SiAlON phase in the as-sintered ceramic material.

The same relationship held true for Examples 8, 9, 10 and 11 wherein each one of these examples had the same overall composition of: 82.27 weight percent silicon nitride (alpha-silicon nitride and beta-silicon nitride), 5.97 weight percent aluminum nitride, 3.56 weight percent alumina, and 8.2 weight percent ytterbia. Yet, the starting silicon nitride powder for Examples 8, 9, 10 and 11 contained 0 weight percent, 1.6 weight percent, 2 weight percent, and 8 weight percent, respectively.

Table 6 shows that the crystalline phases of Examples 8, 9, 10 and 11 comprised 65.5 weight percent, 49.7 weight percent, 45 weight percent and 37.7 weight percent alpha prime SiAlON phase, respectively, with the balance comprising beta prime SiAlON phase. Like for the above Examples 5 and 6, these examples show that even though the overall starting powder compositions and the processing were the same, by controlling the amount of beta-silicon nitride in the silicon nitride starting powder, one can control the content of the alpha prime SiAlON phase in the as-sintered ceramic material.

The same relationship held true for Examples 12 and 13 wherein each one of these examples had the same overall composition of: 84.3 weight percent silicon nitride (alpha-silicon nitride and beta-silicon nitride), 6.00 weight percent aluminum nitride, 1.50 weight percent alumina, and 8.20 weight percent ytterbia. Yet, the starting silicon nitride powder for Examples 12 ands 13 contained 1.6 weight percent and 0 percent, respectively.

Table 6 shows that the crystalline phases of Examples 12 and 13 comprised 61.6 weight percent and 78 weight percent alpha prime SiAlON phase, respectively, with the balance comprising beta prime SiAlON phase. These examples show that even though the overall starting powder compositions and the processing were the same, by controlling the amount of beta-silicon nitride in the silicon nitride starting powder, one can control the content of the alpha prime SiAlON phase in the as-sintered ceramic material.

For wear applications, it is preferable that the beta-silicon nitride content of the starting silicon nitride powder comprises an amount greater than or equal to 0 weight percent and less than or equal to 1.6 weight percent and the alpha-silicon nitride content comprises an amount greater than or equal to 98.4 weight percent and less than or equal to 100 weight percent. For cutting tool applications, it is preferable that the beta-silicon nitride content of the starting silicon nitride powder comprise an amount greater than 0 and less than 1.6 weight percent and the alpha-silicon nitride content comprises an amount greater than 98.4 and less than 100 weight percent.

The examples also show that the alpha prime SiAlON content is the highest in the examples with zero weight percent beta silicon nitride in the starting silicon nitride powder. More specifically, Examples 5, 8 and 13 had an alpha prime SiAlON phase content of 83.9 weight percent, 65.5 weight percent, and 78 weight percent, respectively. The compositions with the higher alpha prime SiAlON contents had fracture toughnesses greater than the examples wherein the starting silicon nitride powders contained 8 weight percent beta silicon nitride and 92 weight percent alpha silicon nitride. Example 5 was the composition with the highest alpha prime SiAlON content (83.9 weight percent) and also had the highest hardness (20.31 Hvn).

Examples 14 through 19 were prepared to determine the physical properties of certain compositions. Examples 14 through 18 were prepared with 0 weight percent beta silicon nitride in the starting silicon nitride powder (which means that the starting silicon nitride powder comprised about 100 weight percent alpha silicon nitride) so as to maximize the alpha prime SiAlON content in the sintered body for each composition. Example 19 was made from a powder mixture that contained silicon nitride powder comprising about 2 weight percent beta-silicon nitride and about 98 weight percent alpha-silicon nitride. Table 7 below sets forth the compositions of the starting powder mixture for Examples 14 through 19. Batch No. 1145D (Example 19) is a comparative example and is of the same composition as Batch No. 1197G (Example 18), except that all of the silicon nitride in Batch No. 1145D (Example 19) was SNE-10 silicon nitride from Ube Industries.

The continuous sintering parameters and the hardness and fracture toughness are set forth in Table 8 for Examples 14 through 19. Examples 15 and 16, each of which had a lower rare earth content, were HIPed (hot isostatically pressed) after completion of the continuous sintering process. The maximum HIP temperature was 1830 degrees Centigrade for 30 minutes at a total pressure of 20,000 psi wherein 150 psi was nitrogen and the balance was argon.

TABLE 7

Starting Powder Composition for Examples 14 through 19

| Example/Batch No. | Silicon Nitride (wt %) | *beta-Silicon Nitride (wt %) | Aluminum nitride (wt %) | Alumina (wt %) | Ytterbia (wt %) |
|---|---|---|---|---|---|
| 14/1197A | 80.8 | 0 | 5.2 | 5.8 | 8.20 |
| 15/1197D | 85.3 | 0 | 4.8 | 3.7 | 6.2 |
| 16/1197F | 79.3 | 0 | 7.5 | 7.0 | 6.2 |
| 17/1417A | 77.90 | 0 | 7.6 | 6.3 | 8.2 |
| 18/1197G | 79.8 | 0 | 9.0 | 3.0 | 8.20 |
| 19/1145D | 79.8 | 2 | 9.0 | 3.0 | 8.20 |

*Weight percent of the starting silicon nitride powder that comprised beta silicon nitride and the balance of the silicon nitride powder was alpha silicon nitride and impurities.

TABLE 8

Sintering Parameters and Physical Properties of Examples 14–19

| Example | Composition [Batch No.]/Wt. % Beta silicon nitride | Sintering Parameters | Hardness [Hvn Gpa] | Fracture Toughness [$K_{ic}$ Mpa m$^{1/2}$] | W/o alpha' SiALON |
|---|---|---|---|---|---|
| 14 | 1197A/0% | 1550/1700/1800/1800 @ 30 minutes per heating zone | 17.52 | 6.12 | 33.5 |
| 15 | 1197D/0% | 1550/1700/1800/1800 @ 30 minutes per heating zone | 19.08 | 6.91 | 34.8 |
| 16 | 1197F/0% | 1550/1700/1800/1800 @ 17 minutes per heating zone | 18.63 | 6.12 | 42.8 |
| 17 | 1417A/0% | 1550/1700/1765/1765 @ 30 minutes per heating zone | 19.79 | 6.39 | 58.3 |
| 18 | 1197G/0% | 1550/1700/1765/1765 @ 30 minutes per heating zone | 19.16 | 6.15 | 83.4 |
| 18a | 1197G/0% | 1550/1700/1800/1800 @ 30 minutes per heating zone | 19.21 | 6.66 | 84.1 |
| 19 | 1145D/2% | 1765/1765/1765/1765 @ 30 minutes per heating zone | | | 75.2 |

Table 8 above sets forth the sintering temperatures (degrees Centigrade) in each one of the four heating zones and the duration (minutes) the compact is in each one of the heating zones. Table 8 also sets forth the Vickers Hardness (Hvn) in gigapascals (GPa) and the fracture toughness ($K_{IC}$) in MPa m½. Table 8 also sets forth the content of the alpha prime SiAlON phase in weight percent of the total of the alpha prime SiAlON phase and the beta prime SiAlON phase wherein the remainder of the crystalline phases comprised beta prime SiAlON phase.

Examples 14 and 15as set forth in Tables 7 and 8 each contained 0 weight percent beta-silicon nitride in the silicon nitride starting powder. Although other examples were not prepared and analyzed, applicant would expect that samples of same overall starting powder composition as Example 14 (80.8 weight percent [alpha-silicon nitride and beta-silicon nitride], 5.2 weight percent aluminum nitride, 5.8 weight percent alumina, and 8.20 weight percent ytterbia) and Example 15 (85.3 weight percent [alpha-silicon nitride and beta-silicon nitride], 4.8 weight percent aluminum nitride, 3.7 weight percent alumina, and 6.2 weight percent ytterbia), but wherein the starting silicon nitride powder would contain greater than about 1.6 weight percent (i.e., about 6 weight percent to about 7 weight percent) beta-silicon nitride, would produce as-sintered ceramic material that would contain about 100 weight percent beta prime SiAlON phase as the crystalline phase. In light of such an expectation, it would seem that Examples 14 and 15 also surprisingly show that one can control the content of the alpha prime SiAlON phase in the as-sintered SiAlON ceramic material by controlling the content of the beta-silicon nitride in the silicon nitride starting powder to produce alpha prime SiAlON compositions which in the past those of ordinary skill in the art would have expected to have produced compositions of only beta prime SiAlON phase.

Figure 5:
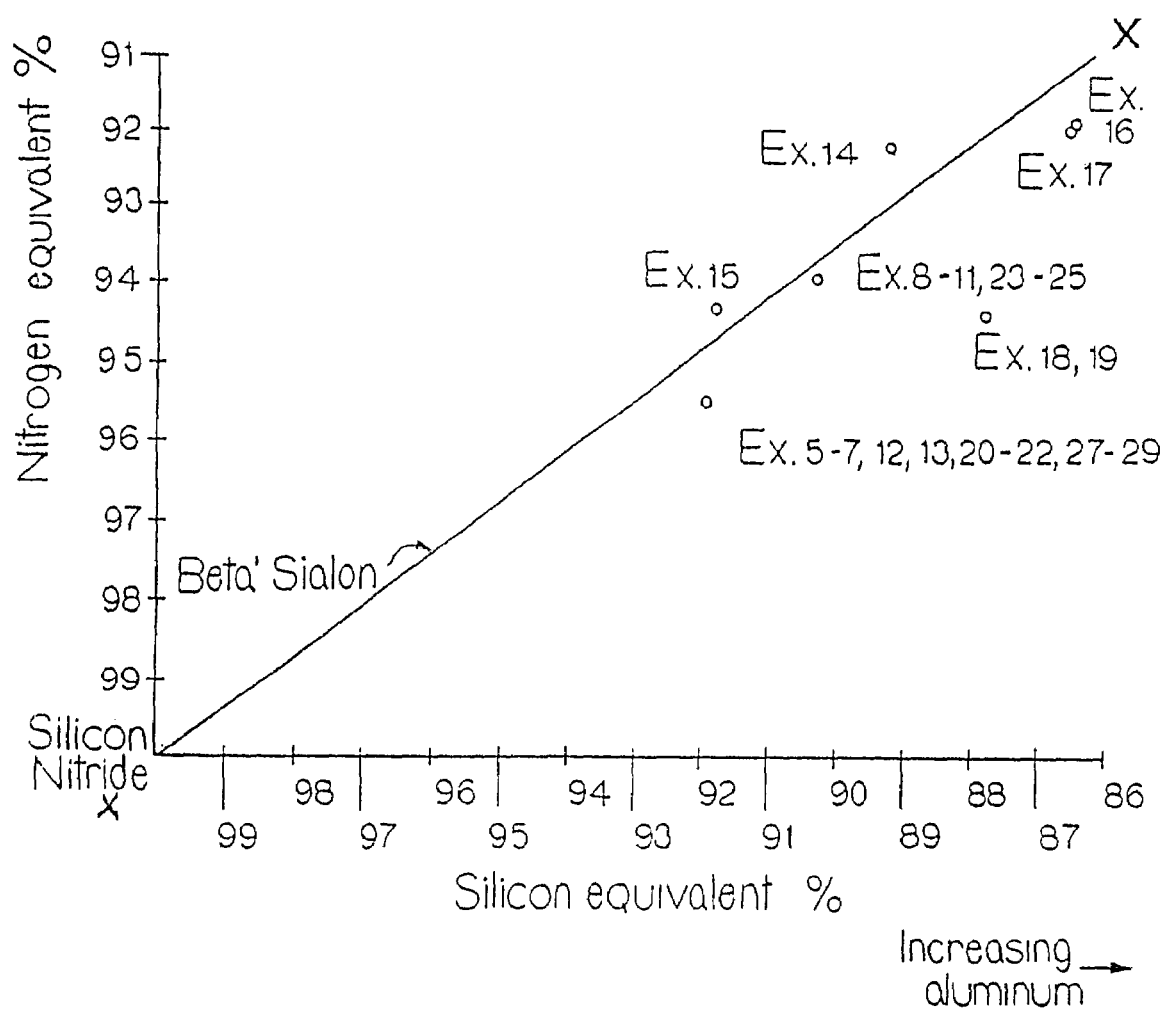
FIG. 5 is a graph showing the projection of the selected examples as designated therein (i.e., Examples 5–25 and 27–29) onto the silicon nitride corner of the base plane of a three-dimensional behavior diagram for SiAlON wherein the four corners of the base plane comprise aluminum nitride, aluminum oxide, silicon oxide and silicon nitride, and the remaining two corners of the six-cornered behavior diagram comprise one corner opposite and above the silicon nitride and aluminum nitride corners of the base plane that is ytterbium nitride and the other corner opposite and above the aluminum oxide and silicon oxide corners of the base plane that is ytterbium oxide.

Referring to FIG. 5, as described earlier herein, this drawing is a graph of the silicon nitride corner of the base plane of a three-dimensional behavior diagram for SiAlON. Heretofore, those of ordinary skill in the art would have expected compositions falling within the region above the line x—x to comprise about 100 weight percent beta prime SiAlON phase and intergranular phase, and those falling below the line x—x to comprise alpha prime SiAlON phase, beta prime SiAlON phase and intergranular phase when using conventional starting silicon nitride powders containing greater than 1.6 weight percent beta-silicon nitride. Surprisingly, as shown in FIG. 5, Examples 14 and 15 are in a region (i.e., an oxygen-rich region) above the line x—x of FIG. 5 in which one of ordinary skill in the art would have expected to form only beta prime SiAlON phase using conventional starting silicon nitride powders containing greater than 1.6 weight percent beta-silicon nitride. This is contrast to a region below the line x—x of FIG. 5 where one of ordinary skill in the art would have expected to produce both alpha prime SiAlON phase and beta prime SiAlON using past practices.

Erosion tests were conducted on certain examples of the inventive ceramic, i.e., Examples 20 through 25 and certain comparative examples, Examples D-1 through D-3. The erosion tests were performed along the guidelines set forth in ASTM Procedure G76-83 (Reapproved 1989) entitled "Standard Practice for Conducting Erosion Tests by Solid Particle Impingement Using Gas Jets". The erosion testing was performed using a Pennwalt/S.S. White Airabrasive Jet Machining Unit—Model H the following parameters: (a) the abrasive was S.S. White Accucut Abrasive that was a 50 mesh silicon carbide particle; (b) the flow rate was 6 grams per minute under a pressure of 40 pounds per square inch; (c) the nozzle (which was made of ROCTEC 100 [a fine grained tungsten carbide with dimolybdenum carbide]) was 2 inches in length with a 0.175 inch outside diameter and a 0.055 inside diameter; and (d) the nozzle position was at an angle of 90 degrees to the surface of the sample wherein the sample surface was prepared by grinding parallel using a 320 grit diamond wheel.

Examples 20 through 22 comprised Batch 1030 processed like Example 3 set forth in Table 2 hereof so as to present physical properties and a microstructure like Example 3. Examples 23–25 comprised Batch 982 processed like Example 4 set forth in Table 2 hereof so as to present physical properties and a microstructure like Example 4. Examples D-1 through D-3 comprised a ceramic material sold by Kennametal Inc. of Latrobe, Pa., (USA) under the designation KYON 2000. KYON 2000 is an alpha prime SiAlON-beta prime SiAlON material that contains yttrium. Each one of Examples D-1 through D-3 had a composition the same as Batch No. 941A and was processed by a batch sintering technique.

Table 9 sets forth the density of the material in grams per cubic centimeter and the results of the erosion tests. The column identified as "Erosion" presents the volume loss of material (cubic centimeters) divided by the total mass (grams) of the abrasive particles that impacted the test specimen. A smaller erosion number represents a greater resistance to erosion.

TABLE 9

Erosion Test Results for Examples 20–25 and D-1 through D-3

| Example/Batch No. | Density (g/cc) | Erosion [cm^3/g] |
|---|---|---|
| 20/1030 | 3.3524 | 6.57E-05 |
| 21/1030 | 3.3553 | 6.09E-05 |
| 22/1030 | 3.3512 | 7.16E-05 |
| 23/982 | 3.3461 | 7.95E-05 |
| 24/982 | 3.3447 | 6.70E-05 |
| 25/982 | 3.3465 | 7.94E-05 |
| D-1 | 3.2414 | 1.17E-04 |
| D-2 | 3.2392 | 1.33E-04 |
| D-3 | 3.2392 | 1.35E-04 |

These erosion test results show that the inventive examples, Examples 20 through 25, have a better erosion resistance than do comparative Examples D-1 through D-3.

Examples 27 through 30 were analyzed by x-ray diffraction to determine the lattice parameters. Table 10 sets forth the Example No., Batch No., and values of the "a" unit cell dimension and "c" unit cell dimension, as well as the margin of error thereof in parenthesis, for the alpha prime SiAlON phase and beta prime SiAlON phase of Examples 27 through 30. The values of the unit cell dimensions were obtained according to the method described below.

TABLE 10

"a" and "c" Unit Cell Dimensions for Examples 27–30

| Example/Batch No. | "a" α'-SiAlON | "c" α'-SiAlON | "a" β'-SiAlON | "c" β'-SiAlON |
|---|---|---|---|---|
| 27/1166C | 7.78461 (.00296) | 5.65844 (.00148) | 7.61649 (.00472) | 2.91717 (.00210) |
| 28/1030 [1227C] | 7.78787 (.00179) | 5.66336 (.00091) | 7.61648 (.00043) | 2.91663 (.00011) |
| 29/1166D | 7.78950 (.00544) | 5.67139 (.00336) | 7.61659 (.00380) | 2.91514 (.00271) |
| 30/1197F | 7.80527 (.00290) | 5.68446 (.00236) | 7.63024 (.00191) | 2.93135 (.00264) |

The samples were in powder form and were prepared for analysis by adding a small amount of NIST (National Institute of Standards and Testing) silicon metal powder. The NIST silicon metal powder is a certified standard material that is used to correct the peak position calculations for errors in instrument alignment. This powder blend, i.e., the powder blend of the sample powder and the NIST silicon metal powder, was mixed with an organic binder and acetone to form a slurry. The resulting slurry was affixed to a glass slide and then allowed to dry.

Diffraction data was collected using standard Braggs optics minimized for peak resolution. Data was collected using as a minimum a 0.008 degrees step in the range of 75 degrees to 135 degrees. These step positions were selected so as to maximum the accuracy of the peak position determination. Data was collected for four seconds at each step.

Collected diffraction data was first corrected for instrument error using the NIST silicon reference pattern. Precise diffraction major peak positions were determined by fitting a pseudo-Voight function to the collected data. Lattice parameters for each of the SiAlON phases were determined from the peak positions by using a "least squares" method. The resultant parameter errors are set forth in parenthesis for the alpha prime SiAlON phase and the beta prime SiAlON phase of each example.

Referring back to the values set forth in Table 10, for the alpha prime SiAlON phase the ratio of c/a, i.e., the ratio of the "c" unit cell dimension and the "a" unit cell dimension, ranges between about 0.726 and about 0.729, and more broadly between about 0.725 and about 0.730. More specifically, taking into consideration the minimum values and maximum values of the "a" and "c" unit cell dimensions, Table 11 below presents the maximum and minimum values for the c/a ratio of the alpha prime SiAlON phase of Examples 27–30.

TABLE 11

Minimum and Maximum Values of c/a ratio of the Alpha Prime SiAlON Phase for Examples 27–30

| Example/Batch No. | Minimum Value of c/a Ratio | Maximum Value of c/a Ratio |
|---|---|---|
| 27/1166C | .7264 | .7273 |
| 28/1227C [1030] | .7269 | .7275 |
| 29/1166D | .7271 | .7290 |
| 30/1197F | .7277 | .7289 |

For Examples 27–30, Table 12 sets forth the z values for the beta prime SiAlON phase wherein the z values were calculated using the following formulas:

$z_a = a - 7.60442/0.03$ $z_c = c - 2.90751/0.027$ $z_{c/a} = (c/a - 0.38226)/0.002$

TABLE 12 z Values for Examples 27–30

| Example | $z_a$ | $z_c$ | $z_{c/a}$ |
|---|---|---|---|
| 27/1166C | 0.402 | 0.358 | 0.374 |
| 28/1227C [1030] | 0.402 | 0.338 | 0.338 |
| 29/1166D | 0.406 | 0.331 | 0.323 |
| 30/1197F | 0.861 | 0.883 | 0.958 |

Applicant contemplates that the ceramic material may optionally include hard phase particles wherein these hard phase particles are present in an amount no greater than about 40 volume percent and no less than about 10 volume percent. Exemplary hard particles are titanium nitride, titanium carbonitride, titanium carbide, titanium boride, hafnium nitride, hafnium carbonitride, hafnium carbide, hafnium boride, zirconium nitride, zirconium carbonitride, zirconium carbide, and zirconium boride. Titanium carbonitride is the preferred hard phase particle.

Although the examples set forth herein use ytterbium, applicant contemplates that the ceramic material may utilize other rare earth components. More specifically, applicant contemplates that any one of either erbium (Er), thulium (Tm), scandium (Sc) or lutetium (Lu) may be substituted for ytterbium in the ceramic material because of their low effective ionic radii. Like ytterbium, the use of these elements (i.e., erbium, thulium, scandium or lutetium) is also likely to avoid the formation of brittle intergranular phases. The effective ionic radii of these ions for a valence of +3 and a coordination number of 6 is as follows: erbium equals 0.890 Angstroms; thulium equals 0.880 Angstroms; ytterbium equals 0.868 Angstroms; lutetium equals 0.861 Angstroms; and scandium equals 0.745 Angstroms. In contrast, yttrium has an ionic radius equal to 0.900 Angstroms [see CRC Handbook of Chemistry and Physics, 79$^{th}$ Edition (1998) Table 14 on page 4–121]. Typically, erbium, thulium, scandium or lutetium would be added as an oxide in the starting powder mixture. Further, applicant contemplates that the ceramic may contain a combination of two or more of ytterbium, erbium, thulium, scandium and/or lutetium.

For some of the starting compositions applicant has found that a crystallization heat treatment after completion of the densification process, i.e., a post-densification crystallization treatment, produced a SiAlON material that had an increase in the content of one or both of the intergranular crystalline phases ytterbium aluminum garnet (YbAG) and the J-phase (which has the formula $Yb_4Si_{2-x}Al_xO_{7+x}N_{2-x}$ wherein x ranges from 0 to 2. Applicant believes that some of these SiAlON materials produced using the post-densification crystallization treatment exhibited properties (e.g., good long duration-high temperature creep resistance and good long duration-high temperature deformation resistance) so that these materials would be especially suitable for use as components in a microturbine.

In regard to using these material subjected to the post-densification treatment as components of a microturbine, the typical components would be a stator, a rotor, a fuel injector nozzle, and a shroud. These components of a microturbine are subjected to temperatures that range between about 1100 degrees Centigrade and about 1350 degrees Centigrade for durations of up to about 10,000 hours. These components need to be made out of materials that have good high temperature wear properties, as well as good long duration-high temperature creep resistance and good long duration-high temperature deformation resistance. It would be expected that these SiAlON materials subjected to the post-densification treatment so as to produce a SiAlON material that has an increase in the content of one or both of the intergranular crystalline phases ytterbium aluminum garnet (YbAG) and the J-phase would exhibit these good high temperature properties.

Exemplary patent documents that show microturbines include U.S. Pat. No. 6,307,278 for a Microturbine Power Generating System, U.S. Pat. No. 6,281,595 for a Microturbine Based Powder Generation System and Method, U.S. Pat. No. 6,198,174 for a Microturbine Powder Generating System, U.S. Pat. No. 6,066,898 for a Microturbine Power Generating System Including Variable-Speed Gas Compressor, and U.S. Pat. No. 6,064,122 for a Microturbine Power Generating System Including a Battery Source for Supplying Startup Power.

In cutting tool applications, applicant would also expect that a cutting tool made from the SiAlON materials subjected to the post-densification treatment would possibly be suitable for use in the finish machining of cast iron.

One set of the starting compositions of those SiAlON materials subjected to the post-densification crystallization treatment are listed in Table 13 below. The components of the starting powder mixture are listed in weight percent of the entire starting powder mixture. The weight percent of the beta-silicon nitride refers to the weight percent of only the silicon nitride starting powder wherein that powder comprises alpha-silicon nitride, beta-silicon nitride, and impurities. These starting powders were processed in a fashion like the processing of the starting powders of Batch No. 982.

TABLE 13

Starting Powder Compositions (in Weight Percent) for Batch Nos. 1197F, 1138A, 1166C, 1138B, 1196A, 1197D, 1197A, 1166D and 1197C

| Batch No. | Silicon Nitride [wt %] | Beta-Silicon Nitride [wt %] | Aluminum Nitride [wt %] | Alumina [wt %] | Ytterbia [wt %] |
|---|---|---|---|---|---|
| 1197F | 79.3 | 0 | 7.5 | 7.0 | 6.2 |
| 1138A | 82.27 | 1.6 | 5.97 | 3.56 | 8.20 |
| 1166C | 84.3 | 0 | 6.00 | 1.50 | 8.20 |
| 1138B | 84.29 | 1.6 | 6.00 | 1.50 | 8.20 |
| 1196A | 82.27 | 1.6 | 5.97 | 3.56 | 8.20 |
| 1197D | 85.3 | 0 | 4.8 | 3.7 | 6.2 |
| 1197A | 80.3 | 0 | 5.2 | 5.8 | 8.2 |
| 1166D | 84.3 | 0 | 6.00 | 1.5 | 8.2 |
| 1197C | 82.1 | 0 | 5.2 | 6.5 | 6.2 |

Certain processing parameters, physical properties and microstructural properties of the densified-only SiAlON materials are set forth in Table 14 below. Those materials listed in Table 14 were not subjected to a post-densification crystallization treatment. Certain physical properties and microstructural properties of the materials subjected to the post-densification crystallization treatment are set forth in Tables 15 through 21.

For Tables 14 through 21, the Vickers hardness was measured using a 18.5 kilogram load and is set forth in gigapacals (GPa). The fracture toughness ($K_{IC}$) was determined using the technique described earlier herein. The weight percent of the alpha prime SiAlON phase is of the total of the alpha prime SiAlON phase and the beta prime SiAlON phase.

For Tables 14 through 21, the densification cycle identifies the sintering parameters used to achieve the initial densification. In this regard, the material was continuously sintered (as described earlier with respect to other examples) so as to be passed through four heating zones. For material in Tables 14 through 21 that have the densification cycle listed as 10.4, the material spent about 30 minutes in each zone wherein Zone 1 was at a temperature of about 1550 degrees Centigrade, Zone 2 was at a temperature of about 1700 degrees Centigrade, Zone 3 was at a temperature of about 1800 degrees Centigrade and Zone 4 was at a temperature of about 1800 degrees Centigrade.

For some of the materials in Tables 14 through 20, the densification cycle includes the designation HIP which represents the existence of a post-sinter (or post-densification) HIPping (hot isostatic pressing) step at the following parameters: maximum temperature equal to no greater than 1800 degrees Centigrade for a duration of 30 minutes at a pressure of 20,000 pounds per square inch. The densification cycle of the D8/1166D material was that the material spent about 30 minutes in each of the four zones where all of the four zones were at a temperature of 1770 degrees Centigrade.

TABLE 14

Certain Physical and Microstructural Properties of Densified (Not Subjected to the Crystallization Treatment) SiAlON Materials of Examples D1 through D9

| Example/Batch No. | Densification Cycle | Hardness [GPa] | Toughness [MPa m$^{1/2}$] | Alpha' SiAlON [wt %] |
|---|---|---|---|---|
| D1/1197F | 10.4 + HIP | 18.63 | 6.12 | 42.8 |
| D2/1138A | 10.4 | 17.96 | 7.24 | 54.9 |
| D3/1166C | 10.4 + HIP | 20.54 | 6.54 | 76.7 |

TABLE 14-continued

Certain Physical and Microstructural Properties of Densified (Not Subjected to the Crystallization Treatment) SiAlON Materials of Examples D1 through D9

| Example/Batch No. | Densification Cycle | Hardness [GPa] | Toughness [MPa m$^{1/2}$] | Alpha' SiAlON [wt %] |
|---|---|---|---|---|
| D4/1138B | 10.4 | 18.48 | 7.47 | 58.3 |
| D5/1196A | 10.4 | 17.41 | 7.74 | 49.7 |
| D6/1197D | 10.4 + HIP | 19.08 | 6.91 | 34.8 |
| D7/1197A | 10.4 + HIP | 17.52 | 6.12 | 33.5 |
| D8/1166D | 1770° C. × 4 @30 min | 20.31 | 6.40 | 83.9 |
| D9/1197C | 10.4 + HIP | — | — | — |

For Tables 15 through 21, the heading of each one of the tables presents the temperature (degrees Centigrade) and duration (minutes) of the post-densification crystallization treatment. For Table 15 through 21, the values set forth for each one of the crystalline phases, i.e., the YbAG crystalline phase and the J-phase crystalline phase, is the relative intensity of the peak for the particular crystalline phase as compared to the major peak, i.e., the peak for beta SiAlON phase.

In regard to the determination of the weight percent of alpha'-SiAlON phase, the weight percent of the alpha'-SiAlON phase is calculated pursuant to the following relationship:

Weight Percent alpha'-SiAlON=$(1.72I_{\alpha'\text{-}SiAlON} \div (1.72I_{\alpha'\text{-}SiAlON}+I_{\beta'\text{-}SiAlON}+0.23I_{Si}+0.48I_{SiC}))\times 100$ percent Similarly, the weight percent of the beta'-SiAlON phase is calculated pursuant to the following relationship:

Weight Percent beta'-SiAlON=$(I_{\beta'\text{-}SiAlON} \div (1.72I_{\alpha'\text{-}SiAlON}+I_{\beta'\text{-}SiAlON}+0.23I_{Si}+0.48I_{SiC}))\times 100$ percent For the above relationships the following exists:

$I_{\alpha'\text{-}SiAlON}$=measured x-ray diffraction intensity of the (201) reflection of alpha'-SiAlON $I_{\beta'\text{-}SiAlON}$=measured x-ray diffraction intensity of the (200) reflection of beta'-SiAlON $I_{Si}$=measured x-ray diffraction intensity of the (111) reflection of silicon metal $I_{SiC}$=measured x-ray diffraction intensity of the (015) reflection of silicon carbide (6 h)

This method is adopted from the method described in the following article: Z. Mencik, M. A. Short, and R. C. Peters, "Quantitative Phase Analysis of Synthetic Silicon Nitride by X-ray Diffraction", Advances in X-ray Analysis, Volume 23, 1979, pages 375–379.

These diffracted x-ray intensities were measured using a Bragg-Brentano focusing optics diffractometer operated at 45 KV and 40 MA. Incident x-ray optics includes a ½ degree divergence slit and 1-degree anti-scatter slit. Receiving optics included a 0.15 mm receiving slit; a curved graphite monochrometer, and a sealed detector. Diffraction data was collected from 10 to 90 degrees 2θ in step mode and analyzed using computerized methods.

The collected diffraction data was first corrected by fitting a polynomial background function. The background corrected data was analyzed using profile-fitting techniques to determine peak positions and intensity for the stated diffracted reflections.

In regard to the determination of the relative intensity of the YbAG phase or the J-phase, the relative intensity of the YbAG or the J-phase is calculated from the following:

Relative Intensity of the YbAG Phase = $I_{YbAG} \div I_{Highest}$

Relative Intensity of the J-phase = $I_{J\text{-}phase} \div I_{Highest}$

For the above relationships, the following exists:

$I_{YbAG}$ = measured x-ray diffraction intensity of the (211) reflection of $Yb_3Al_5O_{12}$ $I_{J\text{-}phase}$ = measured x-ray diffraction intensity of the (201) reflection of $Yb_4Si_{2-x}Al_xO_{7+x}N_{2-x}$, where x is from 0 to 2

$I_{Highest}$ = measured x-ray intensity of highest peak detected (typically beta'-SiAlON)

The diffraction setup was identical to the diffraction setup to determine the weight percent of alpha'-SiAlON and beta'-SiAlON.

TABLE 15

Physical and Microstructural Properties of SiAlON Materials Subjected to a Post-Densification Treatment of 1600 Degrees Centigrade for 10 Hours

| Example/Batch | Densification Cycle | Hardness [GPa] | Toughness [MPa m$^{1/2}$] | Alpha' 'SiAlON [wt %] | YbAG [rel. intensity] | J-phase [rel. intensity] |
|---|---|---|---|---|---|---|
| C1A/1197F | 10.4 + HIP | 19.64 | 5.26 | 38.5 | 8.7 | — |
| C2A/1138A | 10.4 | 18.59 | 6.25 | 47 | 4.5 | 5.3 |
| C3A/1166C | 10.4 + HIP | 19.89 | 4.90 | 70.2 | — | 14.3 |
| C4A/1138B | 10.4 | 19.28 | 6.44 | 59.4 | — | 19 |
| C5A/1196A | 10.4 | 19.02 | 6.72 | 47 | 2.4 | 3.2 |
| C6A/1197D | 10.4 + HIP | 18.74 | 5.92 | 30.9 | 2 | — |
| C7A/1197A | 10.4 + HIP | 18.42 | 5.04 | 30.1 | 10.6 | — |

TABLE 16

Physical and Microstructural Properties of SiAlON Materials Subjected to a Post-Densification Treatment of 1250 Degrees Centigrade for 10 Hours

| Example/Batch | Densification Cycle | Hardness [GPa] | Toughness [MPa m$^{1/2}$] | Alpha' SiAlON [wt %] | YbAG [rel. intensity] | J-phase [rel. intensity] |
|---|---|---|---|---|---|---|
| C1B/1197F | 10.4 + HIP | 17.85 | 5.78 | 41.1 | 2.8 | — |
| C2B/1138A | 10.4 | 19.23 | 6.17 | 50 | 12.8 | 11 |
| C3B/1166C | 10.4 + HIP | 19.22 | 4.46 | 70.2 | 4.8 | 14.3 |
| C4B/1138B | 10.4 | 19.54 | 6.54 | 63.2 | 6 | 18.5 |
| C5B/1196A | 10.4 | 19.68 | 5.07 | 50.4 | 12.3 | 9.4 |
| C6B/1197D | 10.4 + HIP | 18.59 | 6.39 | 32.7 | 5.2 | 6.8 |
| C7B/1197A | 10.4 + HIP | 18.03 | 4.86 | 32.5 | 9.5 | 7 |

TABLE 17

Physical and Microstructural Properties of SiAlON Materials Subjected to a Post-Densification Treatment of 1337 Degrees Centigrade for 2 Hours

| Example/Batch | Densification Cycle | Hardness [GPa] | Toughness [MPa m$^{1/2}$] | Alpha' SiAlON [wt %] | YbAG [rel. intensity] | J-phase [rel. intensity] |
|---|---|---|---|---|---|---|
| C1C/1197F | 10.4 + HIP | 19.18 | 4.86 | 40.7 | 5.7 | 1.1 |
| C2C/1138A | 10.4 | 18.56 | 6.27 | 49.2 | 12.5 | 4.6 |
| C3C/1166C | 10.4 + HIP | 20.68 | 5.64 | 77.3 | 10.2 | 3.5 |
| C4C/1138B | 10.4 | 19.27 | 6.56 | 60.4 | 16.5 | 5.9 |
| C5C/1196A | 10.4 | 18.52 | 6.54 | 48.9 | 10.9 | 3.3 |
| C6C/1197D | 10.4 + HIP | 18.72 | 6.11 | 32.5 | 7.4 | 2.9 |
| C7C/1197A | 10.4 + HIP | 16.99 | 5.17 | 33.1 | 8.2 | 2.9 |

TABLE 18

Physical and Microstructural Properties of SiAlON Materials Subjected to a Post-Densification Treatment of 1512 Degrees Centigrade for 2 Hours

| Example/Batch | Densification Cycle | Hardness [GPa] | Toughness [MPa m$^{1/2}$] | Alpha' SiAlON [wt %] | YbAG [rel. intensity] | J-phase [rel. intensity] |
|---|---|---|---|---|---|---|
| C1D/1197F | 10.4 + HIP | 19.23 | 3.86 | 39.2 | 8.7 | — |
| C2D/1138A | 10.4 | 18.37 | 6.51 | 50.4 | 13.4 | 2.4 |
| C3D/1166C | 10.4 + HIP | 20.84 | 5.36 | 77.2 | 12.2 | 4.7 |
| C4D/1138B | 10.4 | 19.28 | 7.19 | 62 | 24.8 | 9.1 |
| C5D/1196A | 10.4 | 18.72 | 6.39 | 45.9 | 14.3 | 2.6 |
| C6D/1197D | 10.4 + HIP | 19.22 | 5.46 | 32.8 | 6.2 | 2.5 |
| C7D/1197A | 10.4 + HIP | 18.60 | 4.72 | 29.5 | 12.5 | 1.9 |

TABLE 19

Physical and Microstructural Properties of SiAlON Materials Subjected to a Post-Densification Treatment of 1337 Degrees Centigrade for 18 Hours

| Example/Batch | Densification Cycle | Hardness [GPa] | Toughness [MPa m$^{1/2}$] | Alpha' SiAlON [wt %] | YbAG [rel. intensity] | J-phase [rel. intensity] |
|---|---|---|---|---|---|---|
| C1E/1197F | 10.4 + HIP | 18.17 | 4.33 | 43.2 | 6.9 | — |
| C2E/1138A | 10.4 | 17.93 | 5.71 | 50 | 8.5 | 2.6 |
| C3E/1166C | 10.4 + HIP | 19.78 | 4.69 | 70.9 | 13.3 | 3.6 |
| C4E/1138B | 10.4 | 18.06 | 5.94 | 59.9 | 17.6 | 5.8 |
| C5E/1196A | 10.4 | 17.34 | 5.96 | 47.3 | 11.6 | 2.2 |
| C6E/1197D | 10.4 + HIP | 17.45 | 4.98 | 30.7 | 6.3 | 2 |
| C7E/1197A | 10.4 + HIP | 16.92 | 4.55 | 31.3 | 11.5 | 2.1 |

TABLE 20

Physical and Microstructural Properties of SiAlON Materials Subjected to a Post-Densification Treatment of 1512 Degrees Centigrade for 18 Hours

| Example/Batch | Densification Cycle | Hardness [GPa] | Toughness [MPa m$^{1/2}$] | Alpha' SiAlON [wt %] | YbAG [rel. intensity] | J-phase [rel. intensity] |
|---|---|---|---|---|---|---|
| C1F/1197F | 10.4 + HIP | 19.13 | 3.91 | 43.7 | 7.9 | — |
| C2F/1138A | 10.4 | 19.31 | 6.32 | 49.4 | 18.9 | — |
| C3F/1166C | 10.4 + HIP | 21.10 | 5.35 | 77.6 | 14.2 | 3.6 |
| C4F/1138B | 10.4 | 18.20 | 6.90 | 63.6 | 17.4 | 3.3 |
| C5F/1196A | 10.4 | 18.99 | 6.27 | 45.2 | 15.1 | — |
| C6F/1197D | 10.4 + HIP | 18.38 | 5.20 | 32.1 | 9.2 | 1 |
| C7F/1197A | 10.4 + HIP | — | — | 32.8 | 16.9 | — |

TABLE 21

Physical and Microstructural Properties of SiAlON Materials Subjected to a Post-Densification Treatment of 1425 Degrees Centigrade for 10 Hours

| Example/Batch | Densification Cycle | Hardness [GPa] | Toughness [MPa m$^{1/2}$] | Alpha' SiAlON [wt %] | YbAG [rel. intensity] | J-phase [rel. intensity] |
|---|---|---|---|---|---|---|
| C1G/1197F | 10.4 + HIP | 19.48 | 3.87 | 39.8 | 7.5 | — |
| C3G/1166C | 10.4 + HIP | — | — | 78.9 | 6.9 | 30.1 |
| C5G/1196A | 10.4 + HIP | 18.91 | 6.47 | 44.3 | 7.3 | 9 |
| C6G/1197D | 10.4 + HIP | 18.54 | 3.97 | — | — | — |
| C7G/1197A | 10.4 + HIP | 18.27 | 4.17 | 24.7 | 9.7 | 6.9 |
| C8G/1166D | 10.4 + HIP | 20.99 | 4.80 | 72.1 | 3.3 | 15.5 |
| C9G/1197C | 10.4 + HIP | — | — | 18.7 | 6.2 | 4 |

The compositions of another set of the starting powders of the SiAlON materials subjected to the post-densification heat treatment (i.e., crystallization treatment) are listed in Table 22 below. The components of the starting powder mixture are listed in weight percent of the entire starting powder mixture.

These starting powders were processed in a fashion like the processing of the starting powders of Batch No. 982. In this regard, the starting composition was milled for a time of between about 8 hours and about 16 hours with isopropanol and using an alpha'-SiAlON beta'-SiAlON media to form a slurry. After completion of the milling, the slurry was discharged through a 400 mesh screen and then vacuum dried to form a dry powder. The dry powder was then fitzmilled and pellitized using a fluid bed process. Rosin and Carbowax 400 were added as binders during the fluidization process. The pellitized material (dry powder and the binder material) was then dry pressed into green compacts with a density of between about 2 to about 2.15 grams per cubic centimeter. The binder was then removed by an air burnout cycle that had a maximum temperature of about 875 degrees Fahrenheit.

TABLE 22

Compositions of Basic Starting Powder Mixtures [In Weight Percent]

| Composition | Silicon Nitride | Aluminum Nitride | Alumina | Ytterbia |
|---|---|---|---|---|
| 11(33)12 | 83.5 | 6.1 | 4.2 | 6.2 |
| 11(34)16 | 82.27 | 5.97 | 3.56 | 8.20 |
| 12(37)16 | 80.8 | 5.2 | 5.8 | 8.2 |
| 15(32)12 | 79.3 | 7.5 | 7 | 6.2 |
| 15(32)16 | 77.9 | 7.6 | 6.3 | 8.2 |
| 7(39)16 | 85.80 | 4 | 2 | 8.2 |
| 7(40)12 | 87.7 | 3.5 | 2.6 | 6.2 |
| 7(40)14 | 84.30 | 3.60 | 2.40 | 7.00 |
| 8(31)16 | 84.30 | 6.00 | 1.50 | 8.20 |
| 8(32)14 | 82.27 | 5.80 | 1.90 | 7.00 |
| 9(31)12 | 79.80 | 5.75 | 2.25 | 6.20 |
| 9(35)16 | 84.30 | 5.14 | 2.38 | 8.2 |
| 9(36)12 | 85.3 | 4.8 | 3.7 | 6.2 |

Table 23 below sets out the formulas for the overall compositions of each one of the basic starting powder mixtures set out in Table 22 above.

TABLE 23

Overall Formulas For Basic Starting Powder Mixtures in Table 22

| Composition | Formula For the Overall |
|---|---|
| 11(33)12 | $Yb_{0.04}Si_{1.78}Al_{0.24}O_{0.24}N_{2.48}$ |
| 11(34)16 | $Yb_{0.05}Si_{1.76}Al_{0.22}O_{0.24}N_{2.44}$ |
| 12(37)16 | $Yb_{0.05}Si_{1.72}Al_{0.24}O_{0.30}N_{2.38}$ |
| 15(32)12 | $Yb_{0.04}Si_{1.69}Al_{0.32}O_{0.32}N_{2.39}$ |
| 15(32)16 | $Yb_{0.05}Si_{1.66}Al_{0.31}O_{0.32}N_{2.36}$ |
| 7(39)16 | $Yb_{0.05}Si_{1.83}Al_{0.14}O_{0.19}N_{2.49}$ |
| 7(40)12 | $Yb_{0.04}Si_{1.87}Al_{0.14}O_{0.20}N_{2.53}$ |
| 7(40)14 | $Yb_{0.04}Si_{1.86}Al_{0.14}O_{0.20}N_{2.52}$ |
| 8(31)16 | $Yb_{0.05}Si_{1.80}Al_{0.18}O_{0.18}N_{2.50}$ |
| 8(32)14 | $Yb_{0.04}Si_{1.82}Al_{0.18}O_{0.18}N_{2.52}$ |
| 9(31)12 | $Yb_{0.04}Si_{1.83}Al_{0.19}O_{0.19}N_{2.53}$ |
| 9(35)16 | $Yb_{0.05}Si_{1.80}Al_{0.18}O_{0.20}N_{2.48}$ |
| 9(36)12 | $Yb_{0.04}Si_{1.82}Al_{0.19}O_{0.23}N_{2.50}$ |

As can be seen from the above Table 23, the values a, b, c, d, and e obey the following relationships:

$0.03 \leq a \leq 0.06$;

$0.12 < c < 0.37$;

$0.17 < d < 0.32$; and $3 \cdot a + 4 \cdot b + 3 \cdot c = 2 \cdot d + 3 \cdot e$ and $b < 1.9$ and $e < 2.56$.

The starting powder mixtures that are listed in Table 22 were first densified into densified ceramic bodies. In regard to the densification process, the green compacts were loaded into BN (boron nitride) saggers that had dimensions of 4 inches×8 inches×1.25 inches. The specific orientation of the green compacts depended upon the style of compact. For example, there would be three layers of compacts per box with 55 compacts per layer for the compacts that would result in RNG43 and CNGA433 style cutting inserts. The BN saggers were stacked two high and placed on the belt of a continuous sinter furnace. The furnace had four independently controlled heating zones wherein each heating zone was 12 inches long. The ramp rate for the heat up was about 150 degrees Centigrade per minute. The furnace is along the lines of the furnace described in U.S. Pat. No. 5,648,042 to Miller, Jr., identified hereinabove. In regard to the densification processing parameters, the temperature in each one of the heating zones was about 1770 degrees Centigrade, and the green compacts spent about 30 minutes in each heating zone.

The hardness (Hvn) and the fracture toughness ($K_{IC}$) of the densified ceramic bodies were determined and the results set forth in Table 24 below. Table 24 also sets out the composition taken from Table 22, and the batch.

TABLE 24

Properties of Densified Ceramic Bodies

| Composition | Batch | Hardness (GPa) | Toughness (MPa m$^{1/2}$) |
|---|---|---|---|
| 8(31)16 | 1676A | 18.89 | 6.64 |
| 8(31)12 | 1815A | 18.89 | 6.62 |
| 8(31)16 | 1676C | 18.15 | 6.27 |
| 8(31)12 | 1815B | 18.43 | 7.13 |
| 8(32)13 | 1754E | 17.39 | 6.30 |
| 7(39)16 | 1588A | 17.59 | 6.98 |
| 7(40)12 | 1860C | 16.26 | 6.53 |
| 7(40)12 | 1860A | 16.53 | 6.81 |
| 7(40)13 | 1754C | 15.52 | 6.76 |
| 11(35)12 | 1417C | 19.27 | 6.89 |
| 7(40)12 | 1860B | 16.00 | 6.66 |
| 11(34)16 | 1196A | 18.70 | 6.90 |
| 7(40)13 | 1754A | 15.91 | 7.57 |
| 12(37)16 | 1197A | 17.52 | 6.12 |
| 15(32)12 | 1197F | 18.63 | 6.12 |
| 15(32)16 | 1417A | 19.69 | 6.40 |

In regard to the determination of the properties set forth in Table 24, the Vickers hardness (Hvn) was measured using a 18.5 kilogram load and is set forth on gigapascals (GPa). The fracture toughness ($K_{IC}$) was measured on a polished surface employing a Palqvist indentation technique using a 18.5 kilogram load on a Vickers indentor per the article by Evans & Charles cited earlier herein.

To determine the impact of a post-densification heat treatment (i.e., crystallization treatment) on the properties of the densified ceramic bodies, the densified ceramic bodies were then subjected to a post-densification crystallization heat treatment. The crystallization treatment was carried out in a graphite resistance furnace in a nitrogen atmosphere at a temperature equal to about 1425° C. for a duration of about 18 hours so as to form a crystallized ceramic body.

Although the post-densification crystallization heat treatment was carried out as a separate step after the densified ceramic bodies had been cooled to room temperature, applicant contemplates that the crystallization heat treatment may occur continuously after the completion of the densification process.

Table 25 below sets out certain properties of these crystallized ceramic bodies.

TABLE 25

Properties of Crystallized Ceramic Bodies of Selected Compositions Subjected to a Post-Densification Treatment at 1425° C. for 18 Hours

| Composition | Batch | Hardness (GPa) | Toughness (MPa m$^{1/2}$) | Alpha sialon (w %) | YbAG R.I. | J-phase R.I. |
|---|---|---|---|---|---|---|
| 8(31)16 | 1678A | 18.80 | 6.96 | 52.3 | 7.7 | 14.7 |
| 8(31)12 | 1815A | 19.78 | 6.87 | 42 | 2.8 | 7.8 |
| 8(31)16 | 1676C | 18.41 | 6.45 | 41.1 | 10.3 | 12 |
| 8(31)12 | 1815B | 18.69 | 7.18 | 46.1 | 5.1 | |
| 8(32)13 | 1754E | 17.16 | 6.30 | 28.1 | 9.2 | 0.6 |
| 7(39)16 | 1588A | 18.55 | 6.95 | 49.8 | 6.5 | 23.8 |
| 7(40)12 | 1860C | 15.97 | 6.25 | 2.5 | 10.7 | 3.5 |
| 7(40)12 | 1860A | 15.94 | 6.48 | 6.5 | 7.7 | 6.9 |
| 7(40)13 | 1754C | 16.34 | 6.41 | 4.7 | 9.6 | 8.7 |
| 11(35)12 | 1417C | 18.68 | 6.48 | 47.9 | 4.5 | 5.8 |
| 7(40)12 | 1860B | 18.07 | 6.25 | 4.5 | 8.8 | 5.9 |
| 11(34)16 | 1196A | 18.91 | 6.47 | 44.3 | 7.3 | 9 |
| 7(40)13 | 1754A | 18.78 | 7.09 | 12.6 | 7.7 | 11.9 |
| 12(37)16 | 1197A | 18.27 | 4.17 | 24.7 | 9.7 | 6.9 |
| 15(32)12 | 1197F | 19.48 | 3.87 | 39.8 | 7.5 | |
| 15(32)16 | 1417F | 19.40 | 3.87 | 53.7 | 17.8 | |

The weight percent of the alpha-SiAlON phase is the weight percent that the alpha-SiAlON phase comprises of the sum of the alpha-SiAlON phase and the beta-SiAlON phase. The column identified as "YbAG R.I." is the relative intensity of the x-ray diffraction major peak associated with the YbAG phase as compared to the major peak of the two-phase composite. The column entitled as "J-phase R.I." is the relative intensity of the x-ray diffraction major peak associated with the J-phase as compared to the major peak of the two-phase composite.

Referring to Table 26 below, the retained toughness is the ratio of the toughness of the crystallized ceramic bodies to the toughness of the densified (only) ceramic bodies.

TABLE 26

Retained Fracture Toughness of Selected Composites

| Composition | Batch | Retained Toughness |
|---|---|---|
| 8(31)16 | 1676A | 1.05 |
| 8(31)12 | 1815A | 1.04 |
| 8(31)16 | 1676C | 1.03 |
| 8(31)12 | 1815B | 1.01 |
| 8(32)13 | 1754E | 1.00 |
| 7(39)16 | 1588A | 1.00 |
| 7(40)12 | 1860C | 0.96 |
| 7(40)12 | 1860A | 0.95 |
| 7(40)13 | 1754C | 0.95 |
| 11(35)12 | 1417C | 0.94 |
| 7(40)12 | 1860B | 0.94 |
| 11(34)16 | 1196A | 0.94 |
| 7(40)13 | 1754A | 0.94 |
| 12(37)16 | 1197A | 0.68 |
| 15(32)12 | 1197F | 0.63 |
| 15(32)16 | 1417A | 0.61 |

To determine the impact of the nature of the silicon nitride component of the starting powders, applicant varied kinds of silicon nitride powders (i.e., silicon nitride powders with different contents of beta-silicon nitride) that comprised compositions 8(31)16 and 7(39)16. These starting powder mixtures are set forth in Table 27 below. Table 27 sets forth the total beta-silicon nitride content as a percent of the total silicon nitride starting powder. Table 27 also sets forth the specific make-up of the silicon nitride powders wherein the Stark M11 silicon nitride powder contains 8 weight percent beta-silicon nitride, the UBE SNE03 silicon nitride powder contains zero weight percent beta-silicon nitride and the UBE SNE10 silicon nitride powder contains 2 weight percent beta-silicon nitride. For all of the above silicon nitride powders, the balance of the powders comprises alpha-silicon nitride and impurities.

TABLE 27

Starting Powders of Compositions 8(31)16 and 7(39)16 with Varying Amounts [weight percent] of Beta Silicon Nitride

| Stark M11 [8 wt. % beta-silicon nitride] | UBE SNE03 [0 wt/% beta-silicon nitride] | UBE SNE10 [2 wt. % beta-silicon nitride] | Composition | Batch | Weight % beta silicon nitride |
|---|---|---|---|---|---|
| 42.15% | 42.15% | | 8(31)16 | 1676A | 3.372 |
| 84.30% | | | 8(31)16 | 1676C | 6.744 |
| | 84.30% | | 8(31)16 | 1166D | 0 |
| | 42.15% | 42.15% | 8(31)16 | 1598C | 0.843 |
| | 63.22% | 21.07% | 8(31)16 | 1598D | 0.4214 |
| 21.08% | | 83.23% | 8(31)16 | 1676B | 2.951 |
| | | 84.30% | 8(31)16 | 1594B | 1.688 |
| 8.58% | 77.22% | | 7(39)16 | 1588A | 0.6864 |
| 21.45% | 64.35% | | 7(39)16 | 1675B | 1.716 |
| 21.45% | | 64.35% | 7(39)16 | 1675C | 3.003 |
| 42.90% | 42.90% | | 7(39)16 | 1675A | 3.432 |

The content of beta-silicon nitride, as well as the nature of the make-up of the beta-silicon nitride content, in the silicon nitride component of the starting powders had an impact upon the properties of the crystallized ceramic bodies. In this regard, Table 28 sets forth the Vickers hardness as measured using a 18.5 kilogram load and recorded in gigapascals (GPa) and the fracture toughness ($K_{IC}$) as determined by the Evans & Charles technique described earlier. Table 28 also sets forth the percent alpha-SiAlON as a percentage of the sum of the alpha-SiAlON and the beta SiAlON, and the X-ray diffraction relative intensity of the YbAG phase and the J-phase. In this regard, the column identified as "YbAG R.I." is the relative intensity of the x-ray diffraction major peak associated with the YbAG phase as compared to the major peak of the two-phase composite. The column entitled as "J-phase R.I." is the relative intensity of the x-ray diffraction major peak associated with the J-phase as compared to the major peak of the two-phase composite.

TABLE 28

Impact of Beta Silicon Nitride Content on Properties of Crystallized Ceramic Bodies of the Compositions in Table 27 Subjected to a Crystallization Treatment of 1425° C. for a Duration of 18 Hours

| Batch | Vickers Hardness GPa | Fracture Toughness MPa m$^{1/2}$ | % alpha sialon | YbAG R.I. | J-phase R.I. |
|---|---|---|---|---|---|
| 1676A | 18.80 | 6.96 | 52.3 | 7.7 | 14.7 |
| 1676C | 18.41 | 6.45 | 41.1 | 10.3 | 12 |
| 1166D | 20.99 | 4.80 | 72.1 | 3.3 | 15.5 |

TABLE 28-continued

Impact of Beta Silicon Nitride Content on Properties of
Crystallized Ceramic Bodies of the Compositions in
Table 27 Subjected to a Crystallization Treatment of
1425° C. for a Duration of 18 Hours

| Batch | Vickers Hardness GPa | Fracture Toughness MPa m$^{1/2}$ | % alpha sialon | YbAG R.I. | J-phase R.I. |
|---|---|---|---|---|---|
| 1598C | 20.52 | 6.11 | 64.1 | 8.2 | 17.9 |
| 1598D | 22.28 | 5.88 | 73 | 6.4 | 15.1 |
| 1676B | 19.44 | 6.74 | 51 | 9.1 | 13.5 |
| 1594B | 19.15 | 6.64 | 55 | 11.2 | 13.4 |
| 1588A | 18.55 | 6.95 | 49.8 | 6.5 | 23.8 |
| 1675B | 18.30 | 7.37 | 40.3 | 3.7 | 24.4 |
| 1675C | 18.04 | 6.51 | 25.8 | 9.6 | 17.1 |
| 1675A | 17.74 | 7.21 | 28.1 | 5.2 | 18.8 |

The parameters (temperature and duration) of the post-densification heat treatment (i.e., the crystallization treatment) were found to have an impact upon the properties of the crystallized ceramic bodies. In this regard, Table 29 sets forth the properties of crystallized ceramic bodies wherein there were changes in the temperature and duration of the post-densification (crystallization) heat treatment.

TABLE 29

Impact of Crystallization Temperature and Time on
Properties of Composition 8(31)16

| Temperature C. | Time Hr. | Xtal Rn | Hardness GPa | Fracture Toughness (K$_{IC}$) [MPa m$^{1/2}$] | Wt. % alpha | YbAG R.I. | J-phase R.I. |
|---|---|---|---|---|---|---|---|
| 1600 | 10 | E399 | 19.28 | 6.44 | 59.4 |  | 19 |
| 1250 | 10 | E401 | 19.54 | 6.54 | 63.2 | 6 | 18.5 |
| 1337 | 2 | E406 | 19.27 | 6.56 | 60.4 | 6.8 | 16.5 |
| 1512 | 2 | E407 | 19.28 | 7.19 | 62 | 3.8 | 24.8 |
| 1337 | 18 | E408 | 18.08 | 5.94 | 59.9 | 7.4 | 17.6 |
| 1512 | 18 | E409 | 18.20 | 6.90 | 63.6 | 7.3 | 17.4 |
| 1512 | 18 | E411 | 20.01 | 6.84 | 61.2 | 9.9 | 25 |
| 1425 | 10 | E378 | 19.40 | 7.08 | 66.8 | 12.3 | 23 |

The data set forth in Table 29 includes the temperature at which the crystallization treatment occurred, the duration of the crystallization treatment, the Vickers hardness determined as described above, the fracture toughness (K$_{IC}$) as determined by the Evans & Charles technique, the weight percent of alpha-SiAlON phase as a percentage of the sum of the alpha-SiAlON phase and the beta-SiAlON phase, and the relative intensities of the x-ray diffraction major peaks associated with the YbAG phase and the J-phase as compared to the major peak of the two-phase composite.

It is apparent that the present invention provides a ceramic material, and in particular a SiAlON material, that exhibits improved properties so that this material is suitable for use as a cutting insert for metal cutting application, as well as use as a wear part (e.g., plunger rods for pumps, plunger ball blanks, down hole pump check valve blanks, bushings, blast nozzles, and other wear and impact applications).

The patents, patent applications, and other documents identified herein are hereby incorporated by reference herein.

Other embodiments of the invention will be apparent to those skilled in the art from a consideration of the specification of the practice of the invention disclosed herein. It is intended that the specification and examples be considered as illustrative only, and that the true spirit and scope of the invention being indicated by the following claims.

What is claimed is:

1. A method for making a crystallized ceramic body containing a two phase composite comprising an alpha prime SiAlON phase that contains ytterbium and a beta prime SiAlON phase, the process comprising the steps of:
    blending together a starting powder mixture that upon densification forms the SiAlON ceramic, the starting powder includes at least about 70 weight percent silicon nitride powder wherein the silicon nitride powder contains beta silicon nitride in an amount less than or equal to about 1.6 weight percent of the silicon nitride powder, and the starting powder further including one or more powders that contribute aluminum, oxygen, and nitrogen to the beta prime SiAlON phase and aluminum, oxygen, nitrogen and ytterbium to the alpha prime SiAlON phase; and
    densifying the starting powder mixture to form a densified SiAlON ceramic; and
    heat treating the densified ceramic body so as to form the crystallized ceramic body wherein the alpha prime SiAlON phase comprises at least about 20 weight percent of the two phase composite.

2. The method of making a ceramic body of claim 1 wherein the heat treating step occurs at a temperature between about 1250 degrees Centigrade and about 1525 degrees Centigrade and for a duration of between about 2 hours and about 18 hours.

3. The method of making a ceramic body of claim 1 wherein the heat treating step occurs at a temperature between about 1400 degrees Centigrade and about 1450 degrees Centigrade and for a duration of between about 16 hours and about 18 hours.

4. The method of making a ceramic body of claim 1 further including a cooling step after the densifying step wherein the densified ceramic body is at about room temperature.

5. The method of making a ceramic body of claim 1 wherein the heat treating step occurs immediately after completion of the densifying step so that prior to the heat treating step the temperature of the densified ceramic body is not below the temperature at which the heat treating step occurs.

* * * * *